United States Patent
Kawaguchi et al.

(10) Patent No.: US 11,173,671 B2
(45) Date of Patent: Nov. 16, 2021

(54) ELECTRIC HEATING DEVICE

(71) Applicant: FUJI IMPULSE CO., LTD., Osaka (JP)

(72) Inventors: Hirofumi Kawaguchi, Osaka (JP); Yasuo Hashimoto, Osaka (JP)

(73) Assignee: FUJI IMPULSE CO., LTD, Osaka (JP)

(*) Notice: Subject to any disclaimer, the term of this patent is extended or adjusted under 35 U.S.C. 154(b) by 281 days.

(21) Appl. No.: 15/516,117

(22) PCT Filed: Mar. 30, 2015

(86) PCT No.: PCT/JP2015/059893
§ 371 (c)(1),
(2) Date: Mar. 31, 2017

(87) PCT Pub. No.: WO2016/051830
PCT Pub. Date: Apr. 7, 2016

(65) Prior Publication Data
US 2017/0305071 A1  Oct. 26, 2017

(30) Foreign Application Priority Data
Oct. 3, 2014 (JP) .............................. JP2014-204762

(51) Int. Cl.
*H05B 1/00* (2006.01)
*B29C 65/20* (2006.01)
(Continued)

(52) U.S. Cl.
CPC ............ *B29C 65/20* (2013.01); *B29C 65/224* (2013.01); *B29C 66/1122* (2013.01);
(Continued)

(58) Field of Classification Search
CPC ... B29C 65/20; B29C 65/224; B29C 66/1122; B29C 66/43121; B29C 66/81457; B29C 66/81831; B29B 2051/105
See application file for complete search history.

(56) References Cited

U.S. PATENT DOCUMENTS 4,170,449 A * 10/1979 Shuman ................ B29C 51/262
                                                               425/445
4,292,118 A    9/1981 Wyslotsky
(Continued)

FOREIGN PATENT DOCUMENTS

JP       6-59749 A    3/1994
JP     H11-100008 A   4/1999
(Continued)

OTHER PUBLICATIONS

International Search Report and Written Opinion for International Patent Application No. PCT/JP2015/059893, dated Jun. 23, 2015, with English translation of the International Search Report, 12 pages.
International Preliminary Report on Patentability for International Application No. PCT/JP2015/059893 dated Apr. 25, 2017, 8 pages.
Extended European Search Report for European Application No. 15846762.1 dated Nov. 17, 2017.

*Primary Examiner* — Ibrahime A Abraham
*Assistant Examiner* — Ahmad Abdel-Rahman
(74) *Attorney, Agent, or Firm* — Alston & Bird LLP

(57) ABSTRACT

An electric heating device includes a control portion adapted to control electric energy supplied to a heater, based on a before-heating temperature, which is a temperature of at least one of an object, the heater and a heat dissipation portion before the heater generates heat, the control portion is adapted to calculate the temperature of the object, based on the before-heating temperature and the electric energy supplied to the heater.

9 Claims, 12 Drawing Sheets

(51) Int. Cl.
    *B65B 51/10*     (2006.01)
    *B29C 65/00*     (2006.01)
    *B29C 65/22*     (2006.01)
    *H05B 3/00*     (2006.01)
    *B29C 65/38*     (2006.01)

(52) U.S. Cl.
    CPC .. *B29C 66/43121* (2013.01); *B29C 66/73921* (2013.01); *B29C 66/8122* (2013.01); *B29C 66/81457* (2013.01); *B29C 66/81831* (2013.01); *B29C 66/81871* (2013.01); *B29C 66/8324* (2013.01); *B29C 66/849* (2013.01); *B29C 66/91231* (2013.01); *B29C 66/91411* (2013.01); *B29C 66/91651* (2013.01); *B29C 66/91951* (2013.01); *B65B 51/10* (2013.01); *H05B 3/0014* (2013.01); *B29C 65/38* (2013.01); *B29C 66/71* (2013.01); *B29C 66/8227* (2013.01); *B29C 66/91221* (2013.01); *B65B 2051/105* (2013.01)

(56) References Cited

U.S. PATENT DOCUMENTS

| | | | | |
|---|---|---|---|---|
| 5,991,319 A | * | 11/1999 | Zamel | B23K 26/702 |
| | | | | 372/34 |
| 2007/0084553 A1 | * | 4/2007 | Nakajima | B29C 66/83221 |
| | | | | 156/272.8 |
| 2014/0196405 A1 | | 7/2014 | Owens et al. | |

FOREIGN PATENT DOCUMENTS

| | | | | | |
|---|---|---|---|---|---|
| JP | 2003045613 | * | 7/2001 | | B29C 65/30 |
| JP | 2003-45613 A | | 2/2003 | | |
| JP | 2005-007845 A | | 1/2005 | | |
| JP | 2013-112371 A | | 6/2013 | | |
| JP | 2013112371 | * | 6/2013 | | B31B 50/64 |
| WO | WO 2010/116567 | | 10/2010 | | |

* cited by examiner

ELECTRIC HEATING DEVICE

TECHNICAL FIELD

The present invention relates to electric heating devices including a pair of sealing portions for sandwiching objects for sealing them.

BACKGROUND ART

Conventionally, as electric heating devices including a pair of sealing portions for sandwiching objects for sealing them, there have been known electric heating devices including a heater adapted to generate heat by being energized, and a temperature measurement portion for continuously measuring the temperature of the heater (for example, Patent Document 1). These electric heating devices are adapted to energize the heater, such that the temperature measured by the temperature measurement portion becomes a predetermined temperature.

On the other hand, with the electric heating device according to Patent Document 1, an object is sandwiched by a pair of sealing portions and, therefore, when the object is heated by the heater for raising the temperature of the object, it is impossible to accurately measure the temperature of the portion (for example, the to-be-sealed portion) of the object which is being sandwiched by the pair of the sealing portions. Consequently, in some cases, it has been impossible to seal objects in preferable states.

PRIOR ART DOCUMENTS

Patent Documents

Patent Document 1: JP-A No. 6-59749

SUMMARY OF THE INVENTION

Problems to be Solved by the Invention

Therefore, in view of the aforementioned circumstance, it is an object of the present invention to provide an electric heating device capable of improving sealing quality.

Means for Solving the Problems

According to the present invention, there is provided an electric heating device, which includes:
a pair of sealing portions adapted to sandwich an object for sealing this object, at least one of the pair of the sealing portions being adapted to include a heater adapted to generate heat by being energized, the electric heating device comprising:
a heat dissipation portion, the heat dissipation portion being adapted such that heat from the heater is transferred thereto, and the heat dissipation portion being adapted to dissipate this heat; and a control portion adapted to control electric energy supplied to the heater, based on a before-heating temperature, which is a temperature of at least one of the object, the heater and the heat dissipation portion before the heater generates heat;
wherein the control portion is adapted to calculate the temperature of the object, based on the before-heating temperature and the electric energy supplied to the heater.

Also, the electric heating device may have further:
a temperature detection portion adapted to detect the before-heating temperature.

Also, the electric heating device may have a configuration in which:
the sealing portion including the heater includes a supporting portion supporting the heater and constituting at least a portion of the heat dissipation portion,
the temperature detection portion includes a temperature sensor, and
the temperature sensor is placed in contact with the supporting portion in order to detect the before-heating temperature of the supporting portion and also is placed in such a way as to be spaced apart from the heater.

Also, the electric heating device may have a configuration in which:
the control portion is adapted to control the electric energy supplied to the heater and to calculate the temperature of the object, based on the before-heating temperature detected by the temperature detection portion in a state where the energization to the heater is being stopped and, also, in a state where the pair of the sealing portions are sandwiching the object.

Also, the electric heating device may have a configuration in which:
the control portion is adapted to control the electric energy supplied to the heater and to calculate the temperature of the object, based on the before-heating temperature detected by the temperature detection portion after elapse of a predetermined time period in a state where the pair of the sealing portions are sandwiching the object.

Also, the electric heating device may have a configuration in which:
the temperature detection portion is adapted to detect the before-heating temperature of at least one of the heater and the heat dissipation portion,
the control portion is adapted to calculate the temperatures of the heater and the heat dissipation portion, based on the before-heating temperature and the electric energy supplied to the heater, and
the control portion is adapted to stop calculating the temperatures of the heater and the heat dissipation portion, since the calculated temperatures of the heater and the heat dissipation portion have gotten equal to each other, after stopping the energization to the heater.

Also, the electric heating device may have a configuration in which:
the temperature detection portion is adapted to detect the before-heating temperature of at least one of the heater and the heat dissipation portion,
the control portion is adapted to calculate the temperatures of the heater and the heat dissipation portion, based on the before-heating temperature and the electric energy supplied to the heater, and
the control portion is adapted to correct the calculated temperatures of the heater and the heat dissipation portion, based on the before-heating temperature detected by the temperature detection portion, in starting the energization to the heater again, after stopping the energization to the heater.

Also, the electric heating device may have a configuration in which:
the temperature detection portion is adapted to detect the before-heating temperature of at least one of the heater and the heat dissipation portion,
the control portion is adapted to calculate the temperatures of the heater and the heat dissipation portion, based on the before-heating temperature and the electric energy supplied to the heater, and
the control portion is adapted to maintain the energization to the heater stopped, until the calculated temperatures of the heater and the heat dissipation portion have gotten equal to each other, after stopping the energization to the heater.

Also, the electric heating device may have further:

an information input portion adapted to receive an input of information, wherein the control portion is adapted to calculate the before-heating temperature for first sealing, based on the information inputted to the information input portion, and the control portion is adapted to continuously calculate the temperatures of the heater and the heat dissipation portion while repeating the energization to the heater and stop of this energization, and the control portion is further adapted to calculate the before-heating temperature for second and later sealing, based on the calculated temperatures of the heater and the heat dissipation portion.

Also, the electric heating device may have a configuration in which:

the control portion has a calendar function and is adapted to calculate the before-heating temperature for first sealing, based on the calendar function, wherein the control portion is adapted to continuously calculate the temperatures of the heater and the heat dissipation portion while repeating the energization to the heater and stop of this energization, and the control portion is further adapted to calculate the before-heating temperature for second and later sealing, based on the calculated temperatures of the heater and the heat dissipation portion.

Effect of the Invention

As described above, the electric heating device according to the present invention has an excellent advantage of improving the sealing quality.

MODE FOR CARRYING OUT THE INVENTION

First Embodiment

Hereinafter, there will be described a first embodiment of an electric heating device according to the present invention, with reference to FIGS. 1 to 10. More specifically, the present embodiment is on the premise that the electric heating device is an impulse-type heat sealer.

Figure 1:
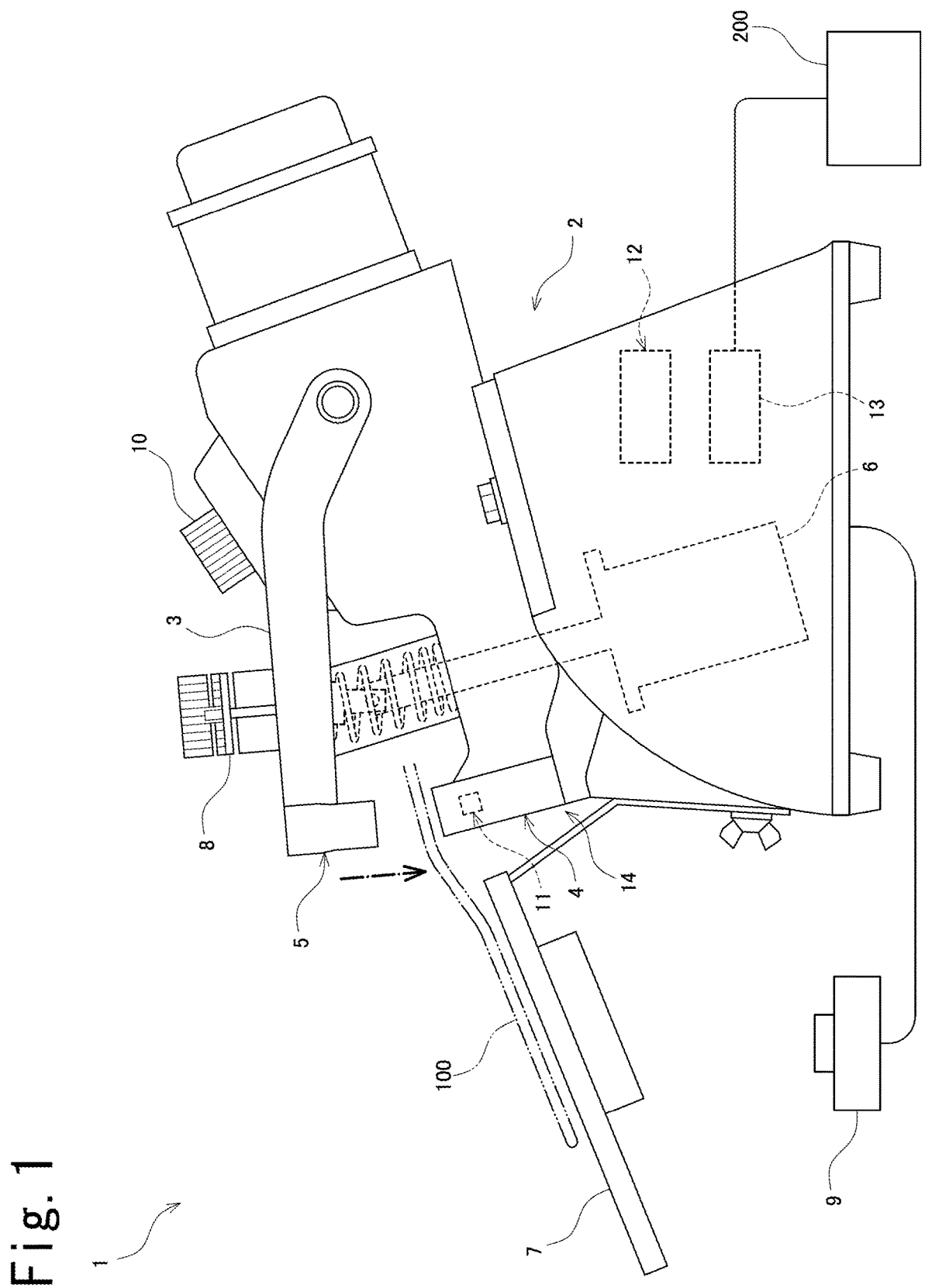
FIG. 1 is a side view of entirety of an electric heating device according to an embodiment of the present invention.

As illustrated in FIG. 1, an electric heating device 1 according to the present embodiment includes a device main body 2, a movable member 3 which can move with respect to the device main body 2, and a pair of sealing portions 4, 5 adapted to get closer to and farther from each other for sandwiching an object 100 (for example, a packaging member made of polyethylene or the like) as a to-be-sealed object for sealing it. One of the pair of the sealing portions 4 and 5 is referred to as a first sealing portion 4, while the other one of them is referred to as a second sealing portion 5.

The electric heating device 1 includes a driving portion 6 for moving the movable member 3, a placing table 7 which is secured to the device main body 2 and adapted to place the object 100 thereon, and a pressure changing portion 8 for changing the pressure with which the pair of the sealing portions 4, 5 press the object 100. Further, the electric heating device 1 includes a command input portion 9 to which commands for sealing are inputted, and a setting input portion 10 to which settings for sealing the object 100 (for example, a set temperature, a heating strength, a type of the object 100, and the like) are inputted.

The electric heating device 1 includes a temperature detection portion 11 adapted to detect the temperature, and a control portion 12 adapted to perform various controls on the device. Further, the electric heating device 1 includes an energy supply portion 13 which is connected to a power supply 200 and adapted to supply electric energy to respective portions in the device.

The device main body 2 secures the first sealing portion 4. Further, the movable member 3 is formed to have an elongated length. Further, the movable member 3 is rotatably mounted at its base end portion to the device main body 2 and, further, secures the second sealing portion 5 at its tip end portion. Accordingly, the driving portion 6 causes the movable member 3 to rotate about its base end portion, so that the pair of the sealing portions 4, 5 get closer to and farther from each other.

Figure 2:
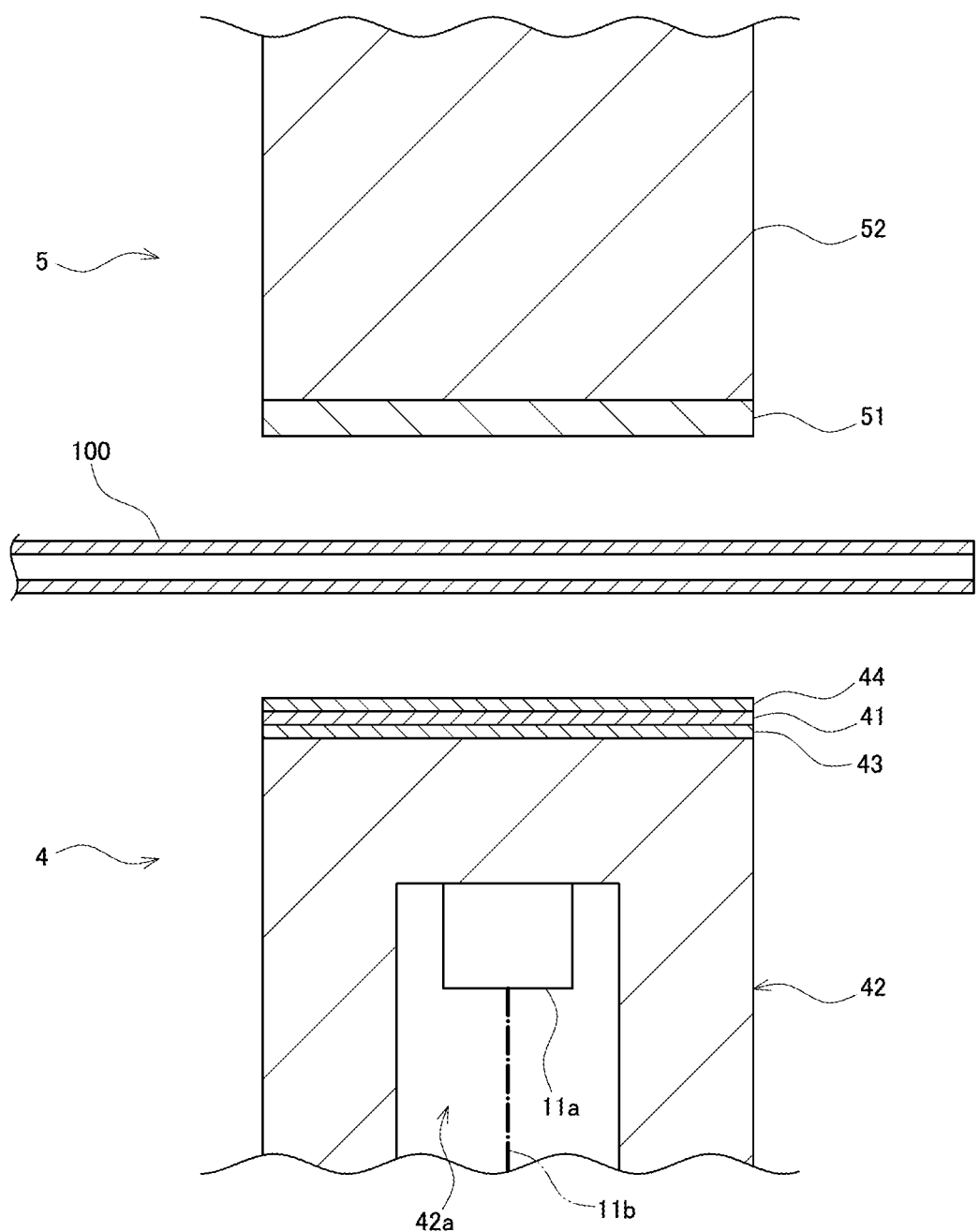
FIG. 2 is a cross-sectional view of main portions of a pair of sealing portions according to the same embodiment.

As illustrated in FIG. 2, the first sealing portion 4 includes a heater 41 adapted to generate heat by being energized, in order to heat the object 100 for fusing it, and, further, includes a supporting portion 42 for supporting the heater 41. Further, the first sealing portion 4 includes an insulation portion 43 placed between the heater 41 and the supporting portion 42 in order to electrically insulate the heater 41 and the supporting portion 42 from each other, and a coating portion 44 which coats the heater 41 over its outer side.

The heater 41 is formed to have a band shape. Further, the heater 41 is formed from a conductive heat generating material which generates heat by being impulsively energized (by being momentarily supplied with a large electric current). In the present embodiment, the heater 41 is formed from nichrome. For example, the heater 41 has a thickwise size (a size in the upward and downward direction in FIG. 2) of 0.1 mm.

The supporting portion 42 is adapted such that heat from the heater 41 is transferred thereto through the insulation portion 43. Further, the supporting portion 42 is adapted to dissipate this heat to the outside. In the present embodiment, the supporting portion 42 is made of a metal (for example, aluminum). For example, the supporting portion 42 has a heightwise size (a size in the upward and downward direction in FIG. 2) of 42 mm.

Further, the electric heating device 1 includes a heat dissipation portion 14, wherein the heat dissipation portion 14 is adapted such that heat from the heater 41 is transferred thereto, and the heat dissipation portion 14 is further adapted to dissipate this heat. Further, the supporting portion 42 forms at least a portion of the heat dissipation portion 14. In the present embodiment, the heat dissipation portion 14 is constituted by the supporting portion 42 and the device main body 2.

The insulation portion 43 is adapted to electrically insulate the heater 41 and the supporting portion 42 from each other and is adapted to transfer heat from the heater 41 to the supporting portion 42. In the present embodiment, the insulation portion 43 is constituted by a glass tape. For example, the insulation portion 43 has a thickwise size (a size in the upward and downward direction in FIG. 2) of 0.1 mm.

The coating portion 44 is adapted to protect the heater 41 and is adapted to enable easily separating the object 100 and the first sealing portion 4 from each other. In the present embodiment, the coating portion 44 is constituted by a fluororesin tape. For example, the coating portion 44 has a thickwise size (a size in the upward and downward direction in FIG. 2) of 0.1 mm.

The second sealing portion 5 includes an elastic portion 51 placed in such a way as to face the first sealing portion 4, and a sealing main body portion 52 which supports the elastic portion 51. In the present embodiment, the elastic portion 51 is constituted by a silicon rubber, and the sealing main body portion 52 is made of a metal (for example, aluminum). For example, the elastic portion 51 has a thickwise size (a size in the upward and downward direction in FIG. 2) of 4 mm, and the sealing main body portion 52 has a thickwise size (a size in the upward and downward direction in FIG. 2) of 42 mm.

The temperature detection portion 11 includes a temperature sensor 11a for measuring the temperature, and a signal line 11b for transmitting, to the control portion 12, data resulted from the measurement by the temperature sensor 11a. The temperature sensor 11a is placed in contact with the supporting portion 42, in order to detect the temperature of the supporting portion 42, and further is placed in such a way as to be spaced apart from the heater 41. Further, the temperature sensor 11a is housed within a housing portion 42a provided inside the supporting portion 42 and is placed inside the supporting portion 42.

Figure 3:
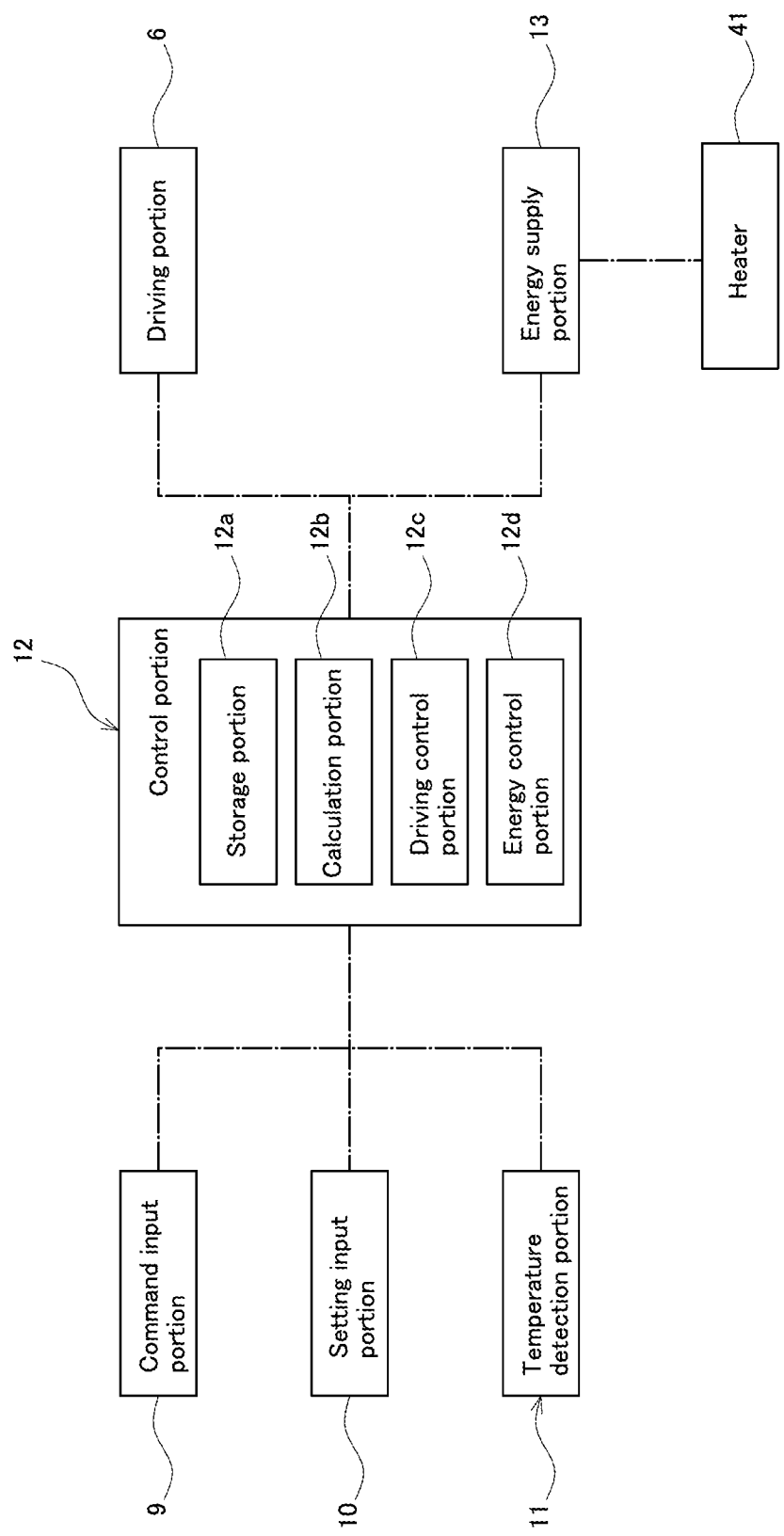
FIG. 3 is a block diagram of the electric heating device according to the same embodiment.
Figure 4:
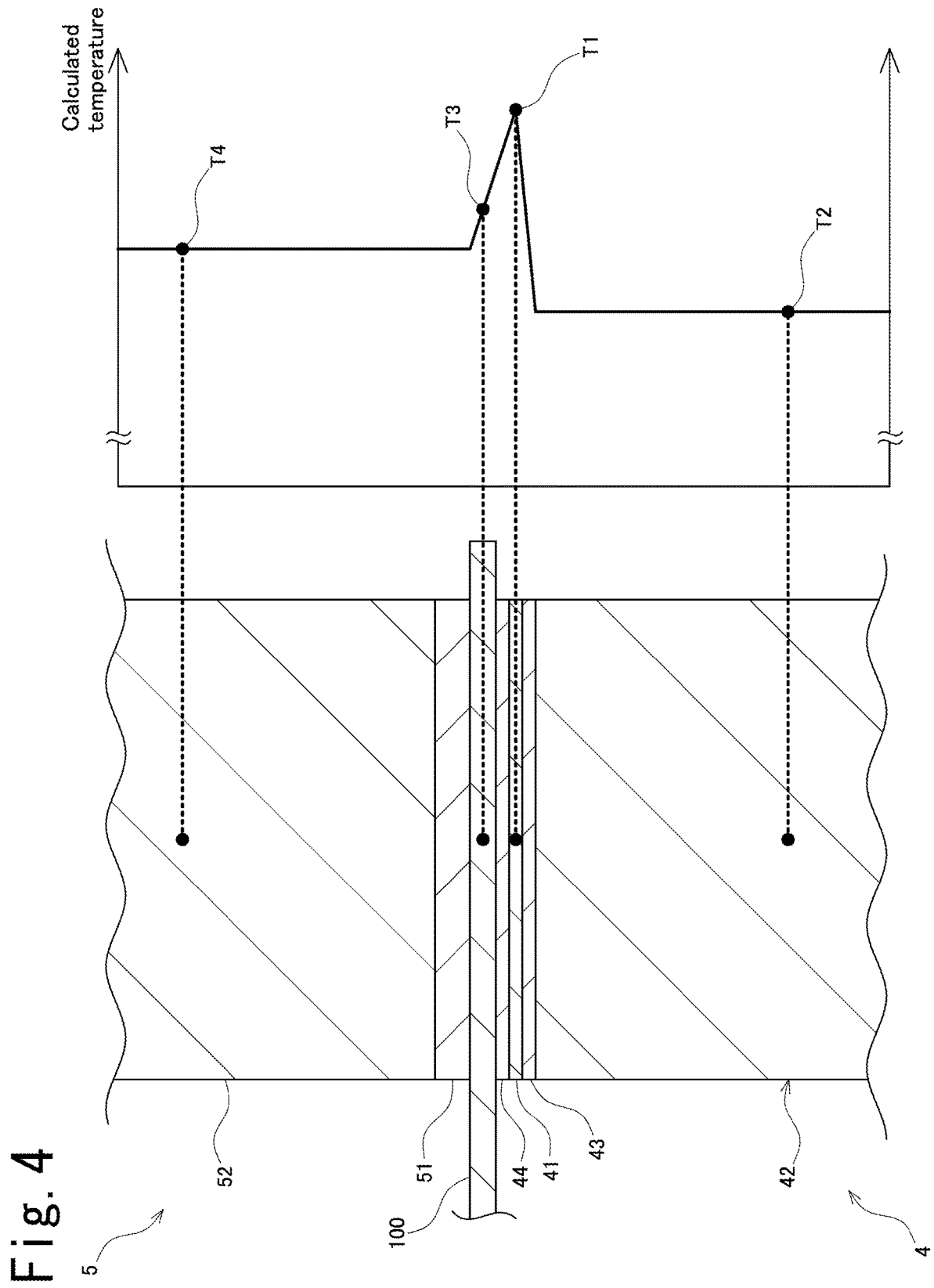
FIG. 4 is a view illustrating a cross-sectional view of main portions of the pair of the sealing portions and calculated temperatures of respective structures, according to the same embodiment.

As illustrated in FIG. 3, the control portion 12 includes a storage portion 12a which stores various types of data, and a calculation portion 12b adapted to perform calculations based on the data stored in the storage portion 12a. Further, the control portion 12 includes a driving control portion 12c adapted to control operations of the driving portion 6, and an energy control portion 12c adapted to control the electric energy supplied to the heater 41 from the energy supply portion 13.

The calculation portion 12b calculates the electric energy (for example, the electric current value, the energization time period, and the like) to be supplied to the heater 41, such that the object 100 reaches a desired set temperature Ts (see FIG. 6), based on the data stored in the storage portion 12a, and based on a before-heating detected temperature (a temperature before heat generation from the heater 41) T0b (see FIG. 6 and FIG. 8) of the supporting portion 42, which is detected by the temperature detection portion 11. Further, the energy control portion 12d controls the electric energy supplied to the heater 41 from the energy supply portion 13, based on the electric energy calculated by the calculation potion 12b.

In the present embodiment, the before-heating detected temperature T0b is a temperature of the supporting portion 42, which is detected by the temperature detection portion 11, in a state where the energization to the heater 41 is being stopped and, also, in a state where the pair of the sealing portions 4, 5 are sandwiching the object 100. More specifically, the before-heating detected temperature T0b is a temperature of the supporting portion 42 which is detected by the temperature detection portion 11, after the elapse of a predetermined time period (hereinafter, refereed to as a "detection standby time period") P1 (see FIG. 6 and FIG. 8), in a state where the pair of the sealing portions 4, 5 are sandwiching the object 100.

Further, the calculation portion 12b calculates the temperatures of the heater 41, the supporting portion 42 and the object 100, based on the before-heating detected temperature T0b, and based on the electric energy supplied to the heater 41. Accordingly, the calculation portion 12b calculates the electric energy (for example, the electric current value, the energization time period, and the like) to be supplied to the heater 41, such that the calculated temperature T3 of the object 100 becomes the desired set temperature Ts.

In the present embodiment, the calculation portion 12b calculates the calculated temperature T1 of the heater 41, the calculated temperature T2 of the supporting portion 42, and the calculated temperature T3 of the object 100, in the following respective manners.

(The calculated temperature T1 of the heater 41)

$$T1 = T0a + \Delta T11 - \Delta T12 - \Delta T13 - \Delta T14 \quad \text{(Equation 1)}$$

Here, T0a and ΔT11 to ΔT14 are as follows.

T0a: the before-heating temperature of the heater 41 (in the present embodiment, the before-heating calculated temperature of the heater 41, which is calculated by the calculation portion 12b)

ΔT11: the temperature change based on the amount of heat generated from the heater 41

ΔT12: the temperature change based on the amount of heat transferred to the supporting portion 42 from the heater 41

ΔT13: the temperature change based on the amount of heat transferred to the object 100 from the heater 41

ΔT14: the temperature change based on the amount of heat transferred to the outside air and the like from the heater 41

(The calculated temperature T2 of the supporting portion 42)

$$T2 = T0b + \Delta T21 - \Delta T22 - \Delta T23 \quad \text{(Equation 2)}$$

Here, T0b and ΔT21 to ΔT23 are as follows.

T0b the before-heating temperature of the supporting portion 42 (in the present embodiment, the before-heating detected temperature of the supporting portion 42, which is detected by the temperature detection portion 11)

ΔT21: the temperature change based on the amount of heat transferred to the supporting portion 42 from the heater 41

ΔT22: the temperature change based on the amount of heat transferred to the device main body 2 from the supporting portion 42

ΔT23: the temperature change based on the amount of heat transferred to the outside air and the like from the supporting portion 42

(The calculated temperature T3 of the object 100)

$$T3 = T0c + \Delta T31 - \Delta T32 - \Delta T33 \quad \text{(Equation 3)}$$

Here, T0c and ΔT31 to ΔT33 are as follows.

T0c: the before-heating temperature of the object 100 (in the present embodiment, the before-heating calculated temperature of the object 100, which is calculated by the calculation portion 12b)

ΔT31: the temperature change based on the amount of heat transferred to the object 100 from the heater 41

ΔT32: the temperature change based on the amount of heat transferred to the second sealing portion 5 from the object 100

ΔT33: the temperature change based on the amount of heat transferred to the outside air and the like from the object 100

In the present embodiment, the calculation portion 12b calculates the respective temperature changes ΔT11 to ΔT13, ΔT21 to ΔT22 and ΔT31 to ΔT32, based on theoretical data according to the resistance value of the heater 41, the heat conductivities of the respective structures and the like, which are stored in the storage portion 12a. Further, the calculation portion 12b calculates the respective temperature changes ΔT14, ΔT23, and ΔT33, based on actually-measured data stored in the storage portion 12a. Further, the calculation portion 12b can also calculate all the data based on theoretical data or calculate all the data based on actually-measured data.

In the present embodiment, the insulation portion 43, the coating portion 44 and the elastic portion 51 have smaller thickwise sizes and, therefore, these respective portions 43, 44, 51 have little thermal capacities. Accordingly, it is possible to ignore the influences of these respective portions 43, 44 and 51, in order to prevent complicacy of the calculations for making the device practical. Thus, the temperature changes ΔT12, ΔT13, ΔT21, ΔT31, ΔT32, which are caused by heat transfer through these respective portions 43, 44, 51, are calculated based on theoretical data derived on the assumption that these respective portions 43, 44 and 51 do not exist.

Further, the calculation portion 12b can also calculate the temperatures of the device main body 2, and the second sealing portion 5, for example, similarly. For example, the calculation portion 12b can also calculate the calculated temperature T4 of the sealing main body portion 52 in the second sealing portion 5, in the following manner. Further, in the following, the calculations are conducted, based on theoretical data derived on the assumption that the elastic portion 51 does not exist, since the influences of the elastic portion 51 can be ignored.

(The calculated temperature T4 of the sealing main body portion 52)

$$T4 = T0d + \Delta T41 - \Delta T42 - \Delta T43 \quad \text{(Equation 4)}$$

Here, T0d and T41 to T43 are as follows.

T0d the before-heating temperature of the sealing main body portion 52 (in the present embodiment, the before-heating calculated temperature of the sealing main body portion 52, which is calculated by the calculation portion 12b)

ΔT41: the temperature change based on the amount of heat transferred from the object 100 to the sealing main body portion 52

ΔT42: the temperature change based on the amount of heat transferred to the movable member 3 from the sealing main body portion 52

ΔT43: the temperature change based on the amount of heat transferred to the outside air and the like from the sealing main body portion 52

As described above, as illustrated in FIG. 4, the calculated temperatures T1 to T4 of the respective structures 41, 42, 100 and 52 are calculated, individually. Thus, the temperatures of the respective structures 41, 42, 100 and 52 can be accurately calculated, for the temperatures of the respective different structures 41, 42, 100, 52. Accordingly, the electric energy supplied to the heater 41 is controlled such that the calculated temperature T3 of the object 100 becomes the desired set temperature Ts and, thus, the object 100 is sealed at the set temperature Ts.

After the completion of the sealing of the object 100 and the stop of the energization to the heater 41, the calculation portion 12b stops calculating the calculated temperatures T1 and T2 of the heater 41 and the supporting portion 42, since the calculated temperatures T1 and T2 of the heater 41 and the supporting portion 42 have gotten equal to each other. This is because of the following reason. Since the temperatures of the heater 41 and the supporting portion 42 have gotten equal to each other, the before-heating calculated temperature T0a of the heater 41 can be inevitably detected, by detecting the before-heating detected temperature T0b of the supporting portion 42 with the temperature detection portion 11, at the start of the next sealing.

Namely, the temperature of the supporting portion 42 before heating, which is detected by the temperature detection portion 11, naturally becomes the before-heating detected temperature T0b of the supporting portion 42, and this temperature also becomes the before-heating calculated temperature T0a of the heater 41 (T0a=T0b). Further, when the sealing of the object 100 has been completed, since the pair of the sealing portions 4, 5 have released the sandwiching of the object 100, the calculation portion 12b stops calculating the calculated temperature T3 of the object 100.

On the other hand, the next sealing may be started, before the calculated temperatures T1, T2 of the heater 41 and the supporting portion 42 have gotten equal to each other. In such cases, the control portion 12 corrects the calculated temperatures T1, T2 of the heater 41 and the supporting portion 42, based on the before-heating detected temperature T0b of the supporting portion 42, which is detected by the temperature detection portion 11.

Further, as will be described later in detail (see FIG. 8), the control portion 12 corrects the calculated temperature T2 of the supporting portion 42, such that it becomes the before-heating detected temperature T0b of the supporting portion 42, which is detected by the temperature detection portion 11. Further, based on this correction, the control portion 12 corrects the before-heating calculated temperature T0a, for the calculated temperature T1 of the heater 41.

The electric heating device 1 according to the present embodiment has the aforementioned structure. Next, with reference to FIGS. 5 to 8, there will be described a sealing method using the electric heating device 1 according to the present embodiment.

At first, with reference to FIGS. 5 and 6, first sealing will be described.

Figure 6:
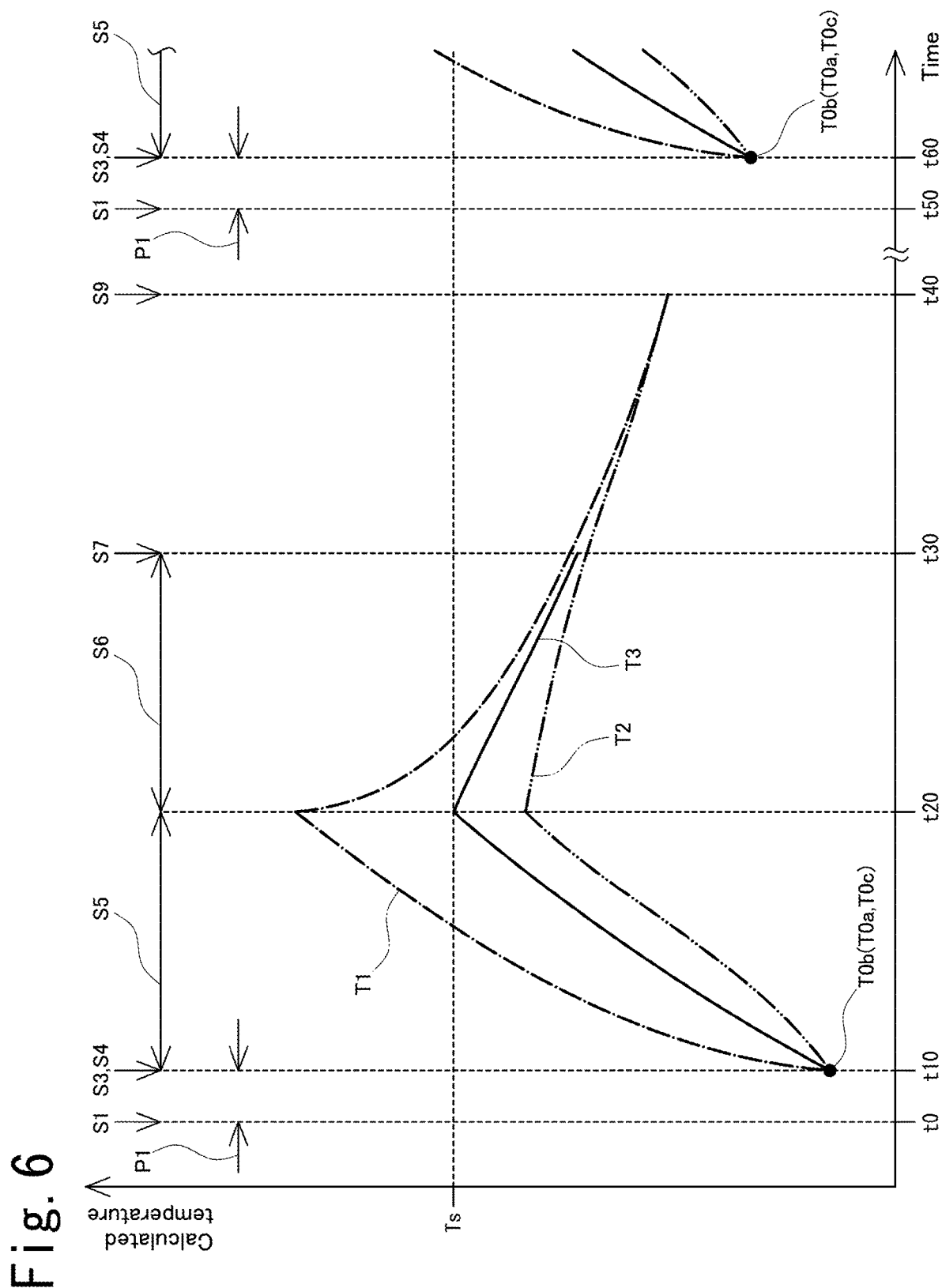
FIG. 6 is a view illustrating the sealing method using the electric heating device according to the same embodiment, illustrating the calculated temperatures at respective portions.

If the object 100 is placed between the pair of the sealing portions 4 and 5, and a command for sealing is inputted to the command input portion 9, the pair of the sealing portions 4 and 5 sandwich the object 100 therebetween (a sandwiching step S1, a time t0 in FIG. 6). Thereafter, a detection standby time period P1 (for example, 0.2 second) elapses ("Y" in S2) and, therefore, the actual temperature of the supporting portion 42 in this state is detected as the before-heating detected temperature T0b (a temperature detecting step S3, a time t10 in FIG. 6).

At this time, since the detection standby time period P1 has elapsed, heat transfer has occurred between the heater 41, the supporting portion 42 and the object 100, so that the heater 41, the supporting portion 42 and the object 100 have reached a constant temperature (the same temperature or a substantially the same temperature which exerts no influence on the sealing quality). Thus, this detected before-heating detected temperature T0b of the supporting portion 42 also becomes the before-heating calculated temperatures T0a and T0c of the heater 41 and the object 100 (T0a=T0b=T0c).

Further, the control portion 12 starts calculating the calculated temperatures T1 to T3 of the heater 41, the supporting portion 42 and the object 100 (a temperature calculation starting step S4). Further, electric energy is supplied to the heater 41, which causes the heater 41 to generate heat, thereby heating the object 100 (a heating step S5, a time t10 to t20 in FIG. 6). At this time, the control portion 12 calculates the calculated temperatures T1 to T3 of the heater 41, the supporting portion 42 and the object 100, based on the energy supplied to the heater 41, and based on the before-heating temperatures T0a to T0c. Further, the control portion 12 controls the electric energy supplied to the heater 41, such that the object 100 reaches the set temperature Ts.

After the electric energy for causing the object 100 to reach the set temperature Ts has been supplied to the heater 41, the energization to the heater 41 is stopped. Thus, the heater 41, the supporting portion 42 and the object 100 dissipate heat therefrom and, therefore, are cooled (a cooling step S6, a time t20 to t30 in FIG. 6). Thereafter, the pair of the sealing portions 4 and 5 are separated from each other, thereby releasing the sandwiching of the object 100 therebetween (a sandwiching releasing step S7, a time t30 in FIG. 6). Thus, the first sealing has been completed. At this time, the control portion 12 stops the calculation of the calculated temperature T3 of the object 100.

Next, second sealing will be described. More specifically, there is a first case where the second sealing is started after the heater 41 and the supporting portion 42 have been sufficiently cooled and, further, there is a second case where the second sealing is started before the heater 41 and the supporting portion 42 have been sufficiently cooled.

Figure 5:
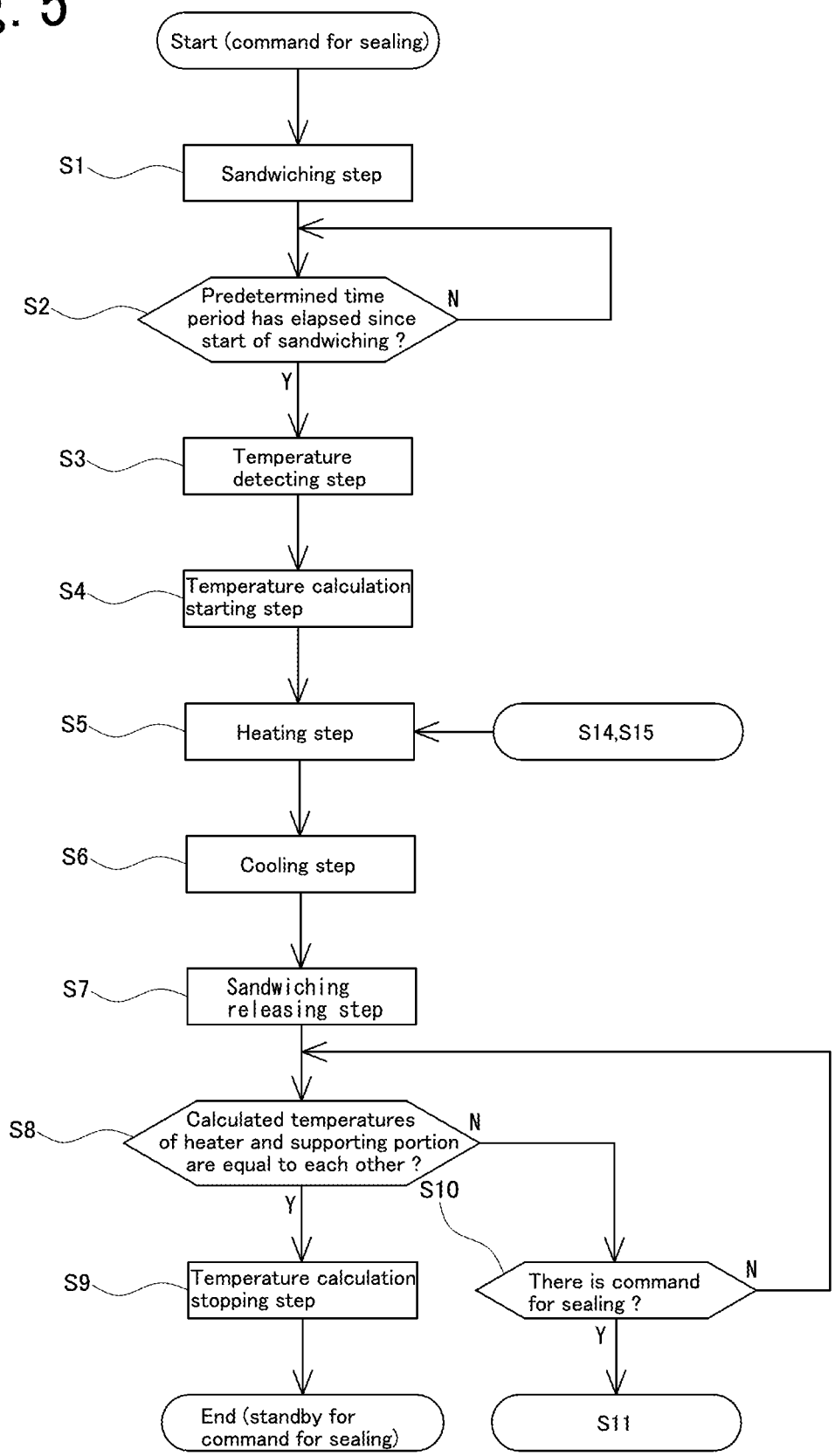
FIG. 5 is a flow chart of a sealing method using the electric heating device according to the same embodiment.

In the first case, as illustrated in FIGS. 5 and 6, since the heater 41 and the supporting portion 42 have been sufficiently cooled, the calculated temperature T1 of the heater 41 and the calculated temperature T2 of the supporting portion 42 are equal to each other ("Y" in S8). Therefore, the control portion 12 stops calculating the calculated temperatures T1 and T2 of the heater 41 and the supporting portion 42 (a temperature calculation stopping step S9, a time t40 in FIG. 6).

In this case, thereafter, if a command for sealing is inputted to the command input portion 9, the steps from the sandwiching step S1 (a time t50 in FIG. 6) are repeated, similarly to for the first sealing. Further, in the temperature detecting step S3 (a time t60 in FIG. 6), the actual temperature of the supporting portion 42 is detected as the before-heating detected temperature T0b, and this detected before-heating detected temperature T0b of the supporting portion 42 also becomes the before-heating calculated temperatures T0a and T0b of the heater 41 and the object 100 (T0a=T0b=T0c).

Figure 7:
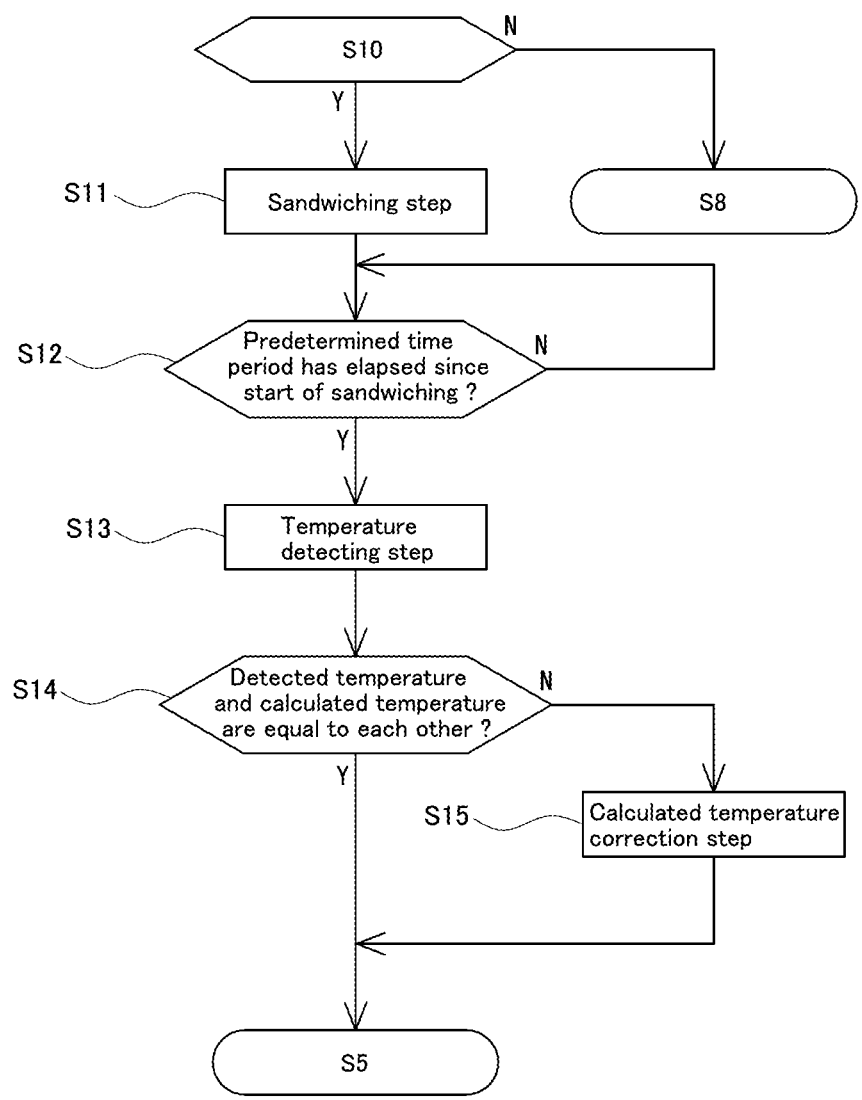
FIG. 7 is a flow chart of the sealing method using the electric heating device according to the same embodiment.
Figure 8:
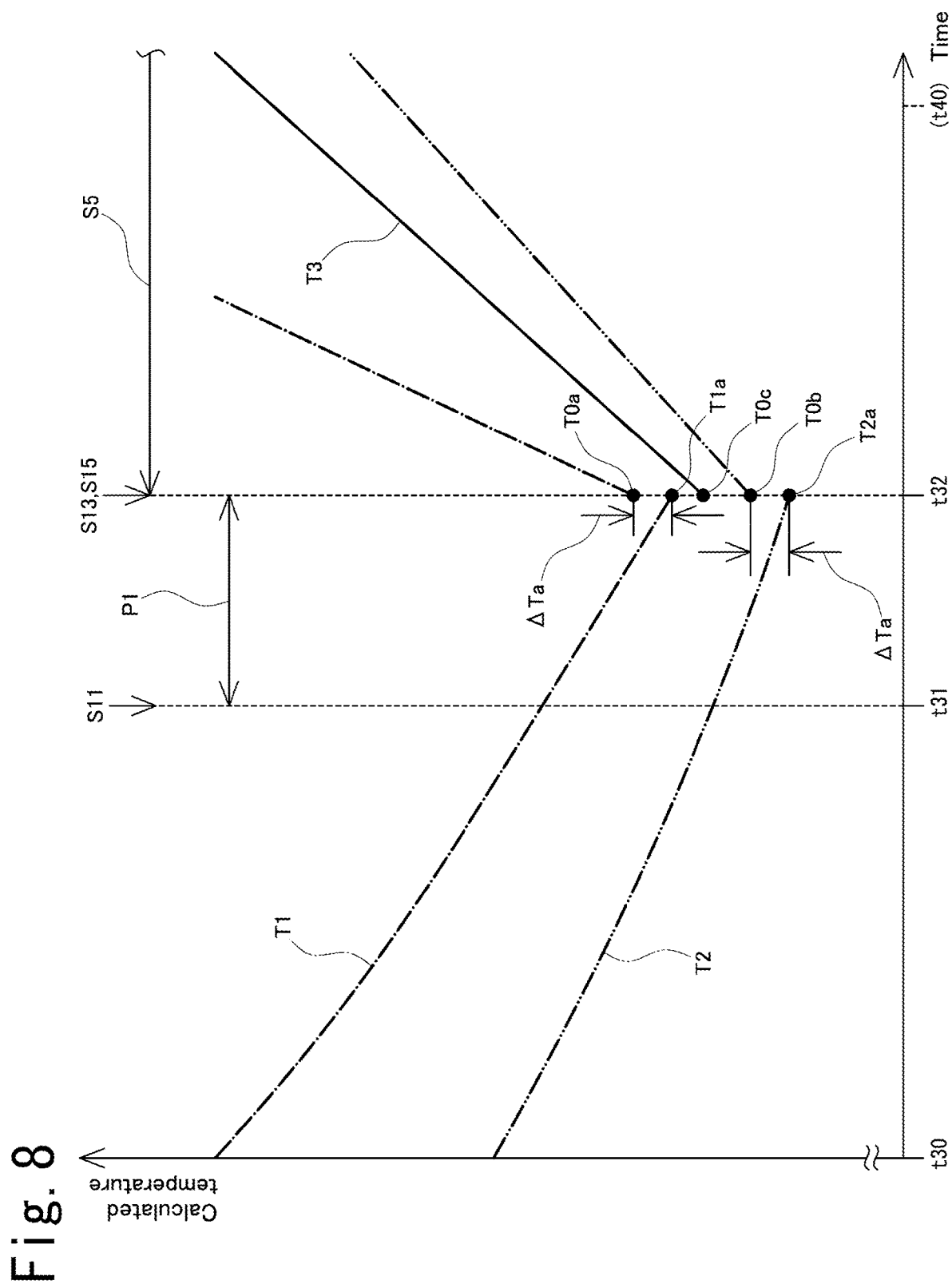
FIG. 8 is a view illustrating the sealing method using the electric heating device according to the same embodiment, illustrating the calculated temperatures at respective portions.

In the second case, in a state where the heater 41 and the supporting portion 42 have not been sufficiently cooled ("N" in S8), a command for sealing is inputted to the command input portion 9 ("Y" in S10). In this case, as illustrated in FIGS. 7 and 8, the pair of the sealing portions 4 and 5 sandwich the object 100 therebetween (a sandwiching step S11, a time t31 in FIG. 8). Further, a time t40 in FIG. 8 represents a time corresponding to the time t4 in FIG. 6.

Thereafter, a detection standby time period P1 (for example, 0.2 second) elapses ("Y" in S12) and, therefore, the actual temperature of the supporting portion 42 in this state is detected as the before-heating detected temperature T0b by the temperature detection portion 11 (a temperature detecting step S13, a time t32 in FIG. 8). At this time, the control portion 12 has continued calculating the calculated temperature T1 and T2 of the heater 41 and the supporting portion 42 and, therefore, a comparison is made between the before-heating detected temperature T0 of the supporting portion 42 detected by the temperature detection portion 11 and the calculated temperature T2 of the supporting portion 42 (S14).

At first, if the before-heating detected temperature T0b of the supporting portion 42 which has been detected by the temperature detection portion 11 and the calculated temperature T2 of the supporting portion 42 which has been calculated by the calculation portion 12 are equal to each other ("Y" in S14), the calculated temperatures T1 and T2 of the heater 41 and the supporting portion 42 are not corrected. Further, similarly to in the first sealing, the heating step S5, the cooling step 6 and the sandwiching releasing step S7 (see FIG. 5) are performed.

On the contrary, if the before-heating detected temperature T0b of the supporting portion 42 which has been detected by the temperature detection portion 11 and the calculated temperature T2 of the supporting portion 42 which has been calculated by the calculation portion 12 are different from each other ("N" in S14), the calculated temperatures T1 and T2 of the heater 41 and the supporting portion 42 are corrected (a calculated-temperature correction step S15, a time t32 in FIG. 8). Although an example of a method for this correction is illustrated in FIG. 8, this correction is not limited to this method, and other correction methods can be also employed.

In the correction method illustrated in FIG. 8, at first, regarding the calculated temperature T2 of the supporting portion 42, the calculated temperature T2a which has been calculated by the control portion 12 is corrected such that it is changed to the before-heating detected temperature T0b of the supporting portion 42 which has been detected by the temperature detection portion 11. Further, regarding the calculated temperature T1 of the heater 41, the calculated temperature T1a which has been calculated by the control portion 12 is corrected, such that it is changed to a before-heating calculated temperature T0a ($=T1a+\Delta Ta$), based on the temperature difference $\Delta Ta$ ($=T0b-T2a$) regarding the supporting portion 42.

Further, the control portion 12 calculates the before-heating calculated temperature T0*c* of the object 100, based on the before-heating calculated temperature T0*a* of the heater 41 and the before-heating detected temperature T0*b* of the supporting portion 42. Thereafter, the heating step S5, the cooling step S6 and the sandwiching releasing step S7 (see FIG. 5) are performed, similarly to in the first sealing. Further, third sealing and later sealing are repeated similarly to this second sealing.

Next, there will be described another sealing method using the electric heating device 1 according to the present embodiment, with reference to FIGS. 9 and 10.

Figure 9:
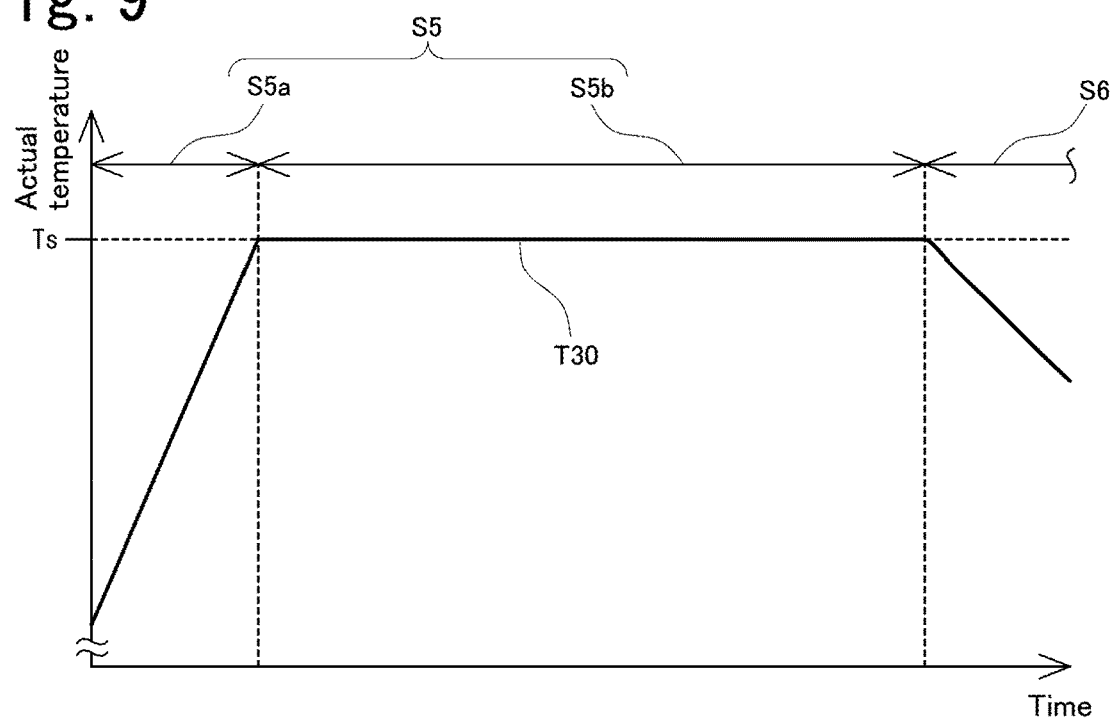
FIG. 9 is a view illustrating a different sealing method using the electric heating device according to the same embodiment, illustrating the actual temperature of an object.
Figure 10:
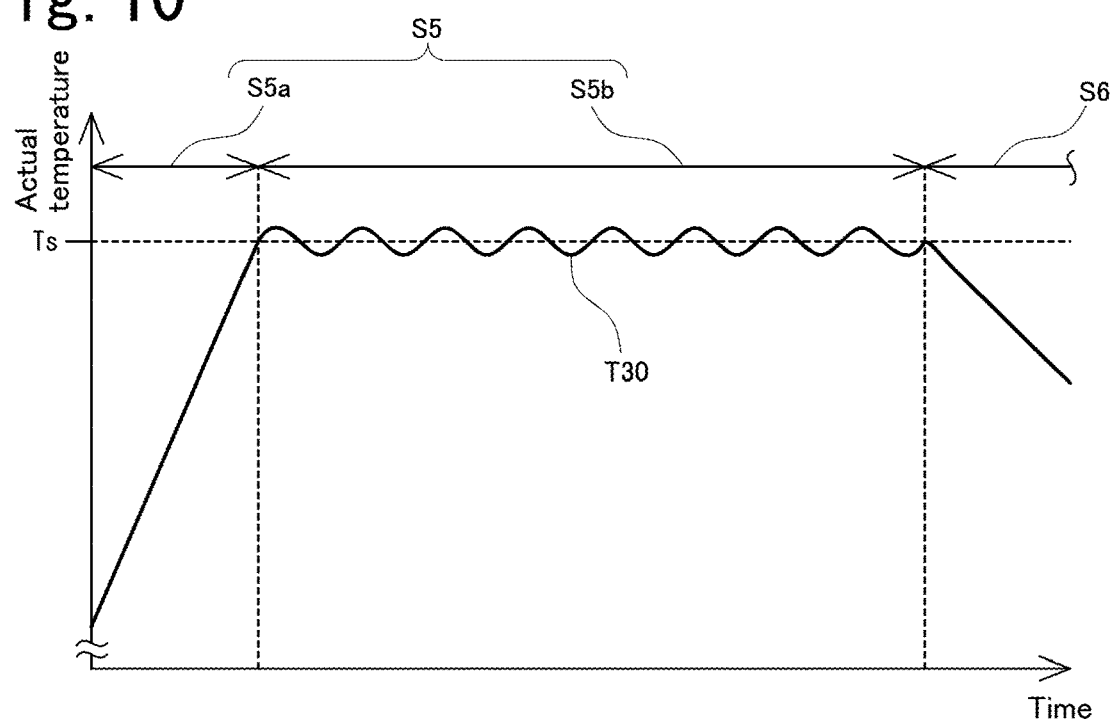
FIG. 10 is a view illustrating a sealing method using an electric heating device in a comparative example, illustrating the actual temperature of an object.

In this another sealing method using the electric heating device 1, as illustrated in FIG. 9, the heating step S5 includes a first heating step S5*a* and a second heating step S5*b*. In the first heating step S5*a*, the control portion 12 controls the electric energy supplied to the heater 41 such that the object 100 reaches the set temperature Ts, similarly to in the aforementioned sealing method. In the second heating step S5*b*, the control portion 12 controls the electric energy supplied to the heater 41 such that the object 100 is maintained at the set temperature Ts.

For example, in the second heating step S5*b*, the control portion 12 controls the electric energy supplied to the heater 41, such that the temperature change ΔT31 based on the amount of heat transferred to the object 100 from the heater 41 is equal to the sum of the temperature change ΔT32 based on the amount of heat transferred from the object 100 to the second sealing portion 5 and the temperature change ΔT33 based on the amount of heat transferred from the object 100 to the outside air and the like (ΔT31=ΔT32+ΔT33). Accordingly, as illustrated in FIG. 9, the actual temperature T30 of the object 100 is stabilized, in the second heating step S5*b*.

On the contrary, for example, there is a sealing method using the electric heating device in a comparative example, wherein this sealing method in the comparative example is adapted to continuously measure the temperature of the heater 41, further, this sealing method is adapted to decrease the electric energy supplied to the heater 41 if the temperature of the heater 41 is higher than a predetermined temperature, and this sealing method is adapted to increase the electric energy supplied to the heater 41 if the temperature of the heater 41 is lower than the predetermined temperature. With this sealing method using the electric heating device in the comparative example, as illustrated in FIG. 10, the actual temperature T30 of the object 100 is not stabilized, in the second heating step S5*b*. As described above, with the electric heating device 1 according to the present embodiment, it is possible not only to cause the object 100 to reach the set temperature Ts, but also to maintain the object 100 at the set temperature Ts.

As described above, the electric heating device 1 according to the present embodiment includes the pair of the sealing portions 4 and 5 adapted to sandwich the object 100 for sealing it, wherein at least one of the pair of the sealing portions 4 and 5 (more specifically, the first sealing portion 4) includes the heater 41 adapted to generate heat by being energized. The electric heating device 1 includes the heat dissipation portion 14, wherein the heat dissipation portion 14 is adapted such that heat from the heater 41 is transferred thereto and, further, the heat dissipation portion 14 is adapted to dissipate this heat. The electric heating device 1 further includes the control portion 12 adapted to control electric energy supplied to the heater 41, based on the before-heating temperature T0*b*, which is the temperature of at least one of the object 100, the heater 41 and the heat dissipation portion 14 (more specifically, the supporting portion 42 in the heat dissipation portion 14) before the heater 41 generates heat. The control portion 12 calculates the temperature of the object 100, based on the before-heating temperature T0*b* and the electric energy supplied to the heater 41.

With this structure, the control portion 12 controls the electric energy supplied to the heater 41, based on the before-heating temperature T0*b*, which is the temperature of at least one of the object 100, the heater 41 and the heat dissipation portion 14 (more specifically, the supporting portion 42 in the heat dissipation portion 14) before the heater 41 generates heat. Further, the control portion 12 calculates the temperature of the object 100, based on the before-heating temperature T0*b*, and the electric energy supplied to the heater 41. Thus, the temperature of the object 100 can be directly controlled. This enables causing the object 100 to reach the desired temperature Ts. This can improve the sealing quality.

Further, the electric heating device 1 according to the present embodiment includes the temperature detection portion 11 for detecting the before-heating temperature T0*b*.

With this structure, the temperature detection portion 11 detects the before-heating temperature T0*b* and, therefore, the control portion 12 controls the electric energy supplied to the heater 41 and calculates the temperature of the object 100, based on the accurate before-heating temperature T0*b*. This enables causing the object 100 to accurately reach the desired temperature Ts, thereby further improving the sealing quality.

Further, in the electric heating device 1 according to the present embodiment, the sealing portion (more specifically, the first sealing portion 4) including the heater 41 includes the supporting portion 42 which supports the heater 41 and constitutes at least a portion of the heat dissipation portion 14. Further, the temperature detection portion 11 includes the temperature sensor 11*a*, and the temperature sensor 11*a* is placed in contact with the supporting portion 42 in order to detect the before-heating temperature T0*b* of the supporting portion 42 and, also, is placed in such a way as to be spaced apart from the heater 41.

With this structure, the temperature sensor 11*a* is placed in contact with the supporting portion 42. This enables detecting the before-heating temperature T0*b* of the supporting portion 42 which constitutes at least a portion of the heat dissipation portion 14, thereby enabling detecting the before-heating temperature T0*b* of the heat dissipation portion 14. Further, since the temperature sensor 11*a* is placed in such a way as to be spaced apart from the heater 41, it is possible to prevent problems which would be induced by contact between the temperature sensor 11*a* and the heater 41.

For example, it is possible to prevent the reduction of the efficiency of heat dissipation of the heater 41 at its portion which would be in contact with the temperature sensor 11*a*. Further, for example, it is possible to prevent the shape of the temperature sensor 11*a* from marking the to-be-sealed portion of the object 100. Further, for example, since the temperature sensor 11*a* measures the temperature of the supporting portion 42 which does not reach a higher temperature than that of the heater 41, it is possible to lower the frequency of occurrences of failures of the temperature sensor 11*a* due to high temperatures.

Further, in the electric heating device 1 according to the present embodiment, the control portion 12 controls the electric energy supplied to the heater 41 and calculates the temperature of the object 100, based on the before-heating temperature T0*b* detected by the temperature detection portion 11 in a state where the energization to the heater is being stopped and, also, in a state where the pair of the sealing portions 4 and 5 are sandwiching the object 100.

With this structure, since the pair of the sealing portions 4 and 5 sandwich the object 100 in the state where the energization to the heater is being stopped, heat transfer occurs between the object 100, the heater 41 and the heat dissipation portion 14, so that the object 100, the heater 41 and the heat dissipation portion 14 reach a constant temperature (the same temperature or a substantially the same temperature). Further, the temperature detection portion 11 detects the before-heating temperature T0$b$ of at least one of the object 100, the heater 41 and the heat dissipation portion 14 (more specifically, the supporting portion 42 in the heat dissipation portion 14) which have reached the constant temperature.

This enables accurately detecting not only the before-heating temperature T0$b$ of the portion (the supporting portion 42 in the heat dissipation portion 14) which is directly detected by the temperature detection portion 11, but also the before-heating temperatures T0$a$ and T0$c$ of the portions (the object 100 and the heater 41) which are not directly detected by the temperature detection portion 11. This enables causing the object 100 to accurately reach the desired temperature Ts, thereby further improving the sealing quality.

Further, in the electric heating device 1 according to the present embodiment, the control portion 12 controls the electric energy supplied to the heater 41 and calculates the temperature of the object 100, based on the before-heating temperature T0$b$ detected by the temperature detection portion 11 after the elapse of a predetermined time period (a detection standby time period P1) in a state where the pair of the sealing portions 4 and 5 are sandwiching the object 100.

With this structure, after the elapse of the predetermined time period (the detection standby time period P1) in the state where the pair of the sealing portions 4 and 5 are sandwiching the object 100, heat transfer has occurred between the object 100, the heater 41 and the heat dissipation portion 14, so that the object 100, the heater 41 and the heat dissipation portion 14 have certainly reached a constant temperature. Further, the temperature detection portion 11 detects the before-heating temperature T0$b$ of at least one of the object 100, the heater 41 and the heat dissipation portion 14 (more specifically, the supporting portion 42 in the heat dissipation portion 14) which have certainly reached the constant temperature.

This enables detecting, more accurately, not only the before-heating temperature T0$b$ of the portion (the supporting portion 42 in the heat dissipation portion 14) which is directly detected by the temperature detection portion 11, but also the before-heating temperatures T0$a$ and T0$c$ of the portions (the object 100 and the heater 41) which are not directly detected by the temperature detection portion 11. This enables causing the object 100 to reach the desired temperature Ts more accurately, thereby further improving the sealing quality.

Further, in the electric heating device 1 according to the present embodiment, the temperature detection portion 11 detects the before-heating temperature T0$b$ of at least one of the heater 41 and the heat dissipation portion 14 (more specifically, the supporting portion 42 in the heat dissipation portion 14), and the control portion 12 calculates the temperatures of the heater 41 and the heat dissipation portion 14 (the supporting portion 42), based on the before-heating temperature T0$b$ and the electric energy supplied to the heater 41. Further, the control portion 12 stops calculating the temperatures of the heater 41 and the heat dissipation portion 14 (the supporting portion 42), since the calculated temperatures T1 and T2 of the heater 41 and the heat dissipation portion 14 (the supporting portion 42) have gotten equal to each other, after stopping the energization to the heater 41.

With this structure, after stopping the energization to the heater 41, the control portion 12 stops calculating the temperatures of the heater 41 and the heat dissipation portion 14 (the supporting portion 42), since the calculated temperatures T1 and T2 of the heater 41 and the heat dissipation portion 14 (the supporting portion 42) have gotten equal to each other. This can reduce the calculation load on the control portion 12.

Further, in the electric heating device 1 according to the present embodiment, the temperature detection portion 11 detects the before-heating temperature T0$b$ of at least one of the heater 41 and the heat dissipation portion 14 (more specifically, the supporting portion 42 in the heat dissipation portion 14), and the control portion 12 calculates the temperatures of the heater 41 and the heat dissipation portion 14 (the supporting portion 42), based on the before-heating temperature T0$b$ and the electric energy supplied to the heater 41. Further, in cases of starting energization to the heater 41 again, after stopping the energization to the heater 41, the control portion 12 corrects the calculated temperatures T1 and T2 of the heater 41 and the heat dissipation portion 14 (the supporting portion 42), based on the before-heating temperature T0$b$ detected by the temperature detection portion 11.

With this structure, in cases of starting energization to the heater 41 again, after stopping the energization to the heater 41, the control portion 12 corrects the calculated temperatures T1 and T2 of the heater 41 and the heat dissipation portion 14 (the supporting portion 42), based on the before-heating temperature T0$b$ detected by the temperature detection portion 11. Thus, even if the calculated temperatures T1 and T2 are different from the actual temperatures, it is possible to set the calculated temperatures T1 and T2 to be accurate temperatures.

Further, in the electric heating device 1 according to the present embodiment, in cases of starting energization to the heater 41 again, before the calculated temperatures T1 and T2 of the heater 41 and the heat dissipation portion 14 (the supporting portion 42) have gotten equal to each other, after stopping the energization to the heater 41, the control portion 12 corrects the calculated temperatures T1 and T2 of the heater 41 and the heat dissipation portion 14 (the supporting portion 42), based on the before-heating temperature T0$b$ detected by the temperature detection portion 11.

Second Embodiment

Next, with reference to FIG. 11, a second embodiment of an electric heating device will be described. Further, in FIG. 11, portions designated by the same reference characters as the reference characters in FIGS. 1 to 10 represent elements having substantially the same structures or substantially the same functions (effects) as those of the first embodiment and will not be described redundantly.

Figure 11:
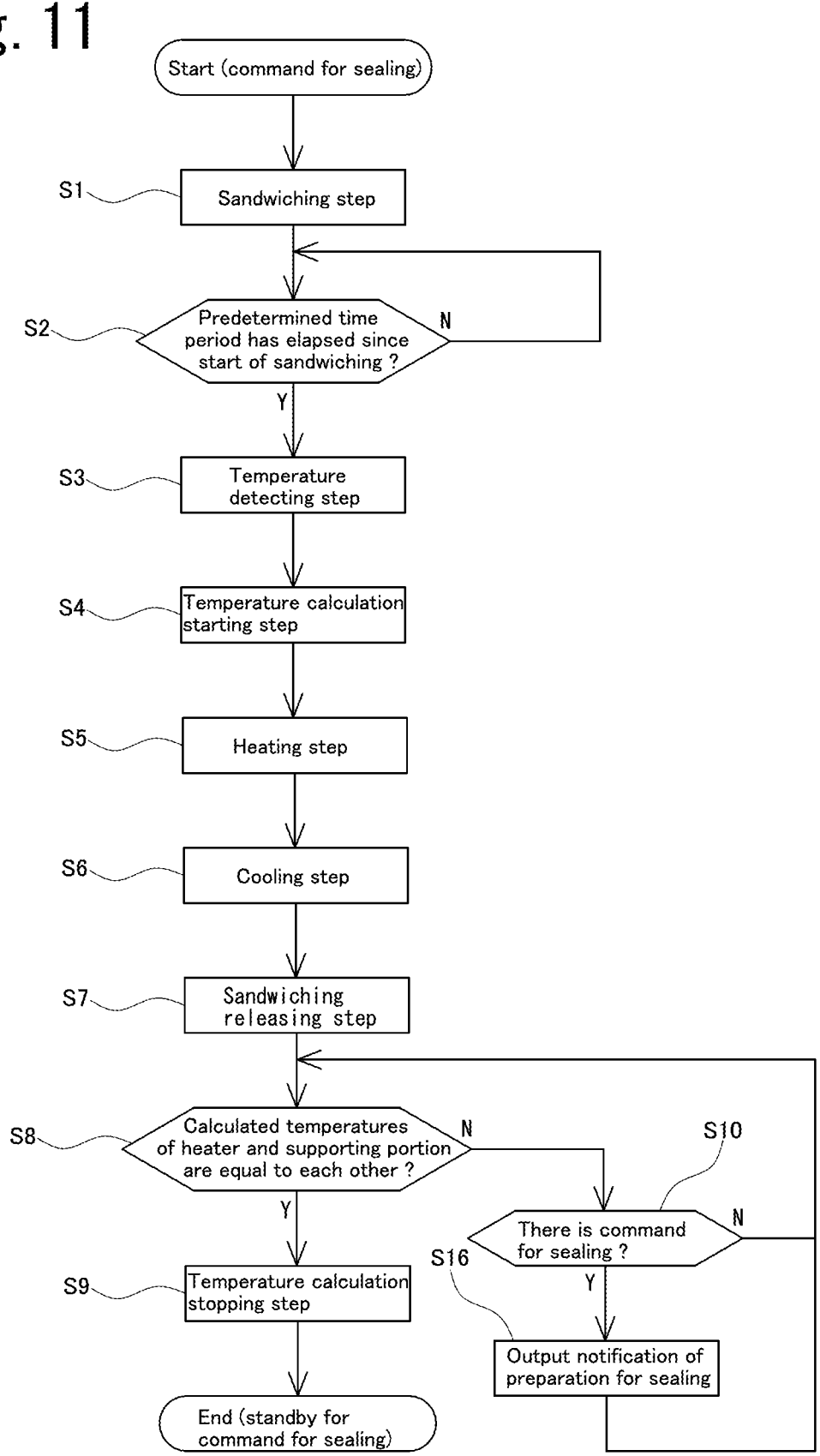
FIG. 11 is a flow chart of a sealing method using an electric heating device according to another embodiment.

The electric heating device 1 according to the present embodiment is different from the electric heating device 1 according to the first embodiment, in that it does not include the calculated-temperature correction step S15, as illustrated in FIG. 11. As illustrated in FIG. 11, in a state where the heater 41 and the supporting portion 42 have not been sufficiently cooled ("N" in S8), if a command for sealing is inputted to the command input portion 9 ("Y" in S10), a notification that the device is being in a state of being incapable of sealing (during preparation for sealing) is outputted to the outside (S16).

Further, the device is kept in the state of being incapable of sealing, until the calculated temperature T1 of the heater 41 and the calculated temperature T2 of the supporting portion 42 have gotten equal to each other ("Y" in S8). As described above, after stopping the energization to the heater 41, the control portion 12 maintains the energization to the heater 41 stopped, until the calculated temperatures T1 and T2 of the heater 41 and the supporting portion 42 have gotten equal to each other.

Further, in general, in the electric heating device 1, after the stop of the energization to the heater 41, the calculated temperature T1 of the heater 41 and the calculated temperature T2 of the supporting portion 42 usually have gotten equal to each other, in about 2 to 5 seconds (about 10 seconds at the longest). Accordingly, even if this control is performed, this will exert little influences on the production efficiency. The electric heating device 1 according to the present embodiment may be either adapted to include an output portion for generating visual outputs (for example, an indication lamp) or adapted to include an output for generating audible outputs (for example, a buzzer), for example.

As described above, in the electric heating device 1 according to the present embodiment, the temperature detection portion 11 detects the before-heating temperature T0$b$ of at least one of the heater 41 and the heat dissipation portion 14 (more specifically, the supporting portion 42 in the heat dissipation portion 14), and the control portion 12 calculates the temperatures of the heater 41 and the heat dissipation portion 14 (the supporting portion 42), based on the before-heating temperature T0$b$ and the electric energy supplied to the heater 41. Further, after stopping the energization to the heater 41, the control portion 12 maintains the energization to the heater 41 stopped, until the calculated temperatures T1 and T2 of the heater 41 and the heat dissipation portion 14 (the supporting portion 42) have gotten equal to each other.

With this structure, after stopping the energization to the heater 41, the control portion 12 maintains the energization to the heater 41 stopped, until the calculated temperatures T1 and T2 of the heater 41 and the heat dissipation portion 14 (the supporting portion 42) have gotten equal to each other. Further, when the energization to the heater 41 is started, again, the temperature detection portion 11 detects the before-heating temperature T0$b$ of at least one of the heater 41 and the heat dissipation portion 14 (more specifically, the supporting portion 42 in the heat dissipation portion 14).

At this time, the heater 41 and the heat dissipation portion 14 have reached a constant temperature. This enables detecting, more accurately, not only the before-heating temperature T0$b$ of the portion (the supporting portion 42 in the heat dissipation portion 14) which is directly detected by the temperature detection portion 11, but also the before-heating temperatures T0$b$ and T0$c$ of the portions (the object 100 and the heater 41) which are not directly detected by the temperature detection portion 11. This enables causing the object 100 to reach the desired temperature Ts more accurately, thereby further improving the sealing quality.

Third Embodiment

Next, with reference to FIG. 12, a third embodiment of an electric heating device will be described. Further, in FIG. 12, portions designated by the same reference characters as the reference characters in FIGS. 1 to 10 represent elements having substantially the same structures or substantially the same functions (effects) as those of the first embodiment and will not be described redundantly.

Figure 12:
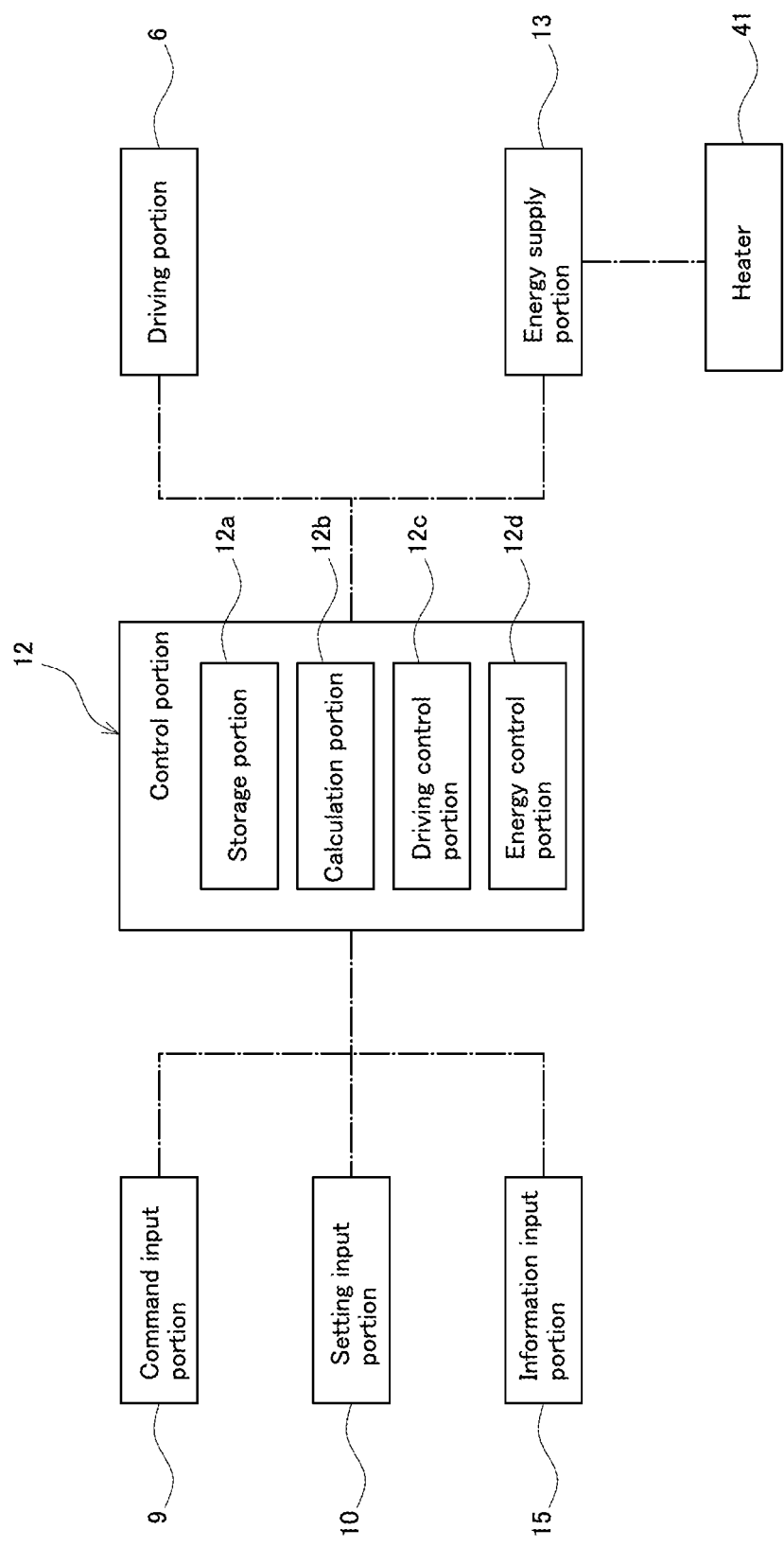
FIG. 12 is a block diagram of an electric heating device according to yet another embodiment.

The electric heating device 1 according to the present embodiment is different from the electric heating device 1 according to the first embodiment, in that it does not include the temperature detection portion 11, but includes an information input portion 15, as illustrated in FIG. 12. Further, the calculation portion 12$b$ calculates the before-heating temperatures T0$a$ to T0$c$ (T0$a$=T0$b$=T0$c$) for first sealing, based on information inputted to the information input portion 15.

Further, the calculation portion 12$b$ continuously calculates the temperatures of the heater 41 and the heat dissipation portion 14 (for example, the supporting portion 42), while energization to the heater and the stop of this energization are repeated. Further, the calculation portion 12$b$ calculates the before-heating temperatures T0$a$ to T0$c$ (T0$a$=T0$b$=T0$c$) for second and later sealing, based on the calculated temperatures T1 and T2 of the heater 41 and the heat dissipation portion 14 (for example, the supporting portion 42). Further, the calculation portion 12$b$ also calculates the temperature of the object 100, during sealing of the object 100.

In the electric heating device 1 according to the present embodiment, the information input portion 15 can be a temperature input portion adapted to receive an input of an outside air temperature, a sealer peripheral temperature, a room temperature or other temperatures. In this structure, the calculation portion 12$b$ calculates the before-heating temperatures T0$a$ to T0$c$ (T0$a$=T0$b$=T0$c$) for first sealing, based on the inputted temperature. For example, the calculation portion 12$b$ can either set the inputted temperature directly as the before-heating temperatures T0$a$ to T0$c$ for the first sealing or set temperatures resulted from predetermined calculations on the inputted temperature as the before-heating temperatures T0$a$ to T0$c$ for the first sealing.

Further, in the electric heating device 1 according to the present embodiment, the information input portion 15 can be a time input portion adapted to receive an input of time, such as month and date, date and time, and the like. In this structure, the storage portion 12$a$ has stored information about the relationship between time and before-heating temperatures T0$a$ to T0$c$, and the calculation portion 12$b$ calculates the before-heating temperatures T0$a$ to T0$c$ for the first sealing, based on the information stored in the storage portion 12$a$, and based on the time (month and date, date and time, and the like) inputted to the information input portion 15.

Further, in the electric heating device 1 according to the present embodiment, the information input portion 15 can be also adapted to receive manual inputs made by an operator. In this structure, for example, the information input portion 15 can be constituted by a ten-key pad, a key board and the like. Further, in the electric heating device 1 according to the present embodiment, the information input portion 15 can be also adapted to automatically receive inputs of information in a wired or wireless manner. In this structure, for example, the information input portion 15 can be constituted by a receiving device or the like which is capable of receiving information through the Internet and the like in a wired or wireless manner.

As described above, the electric heating device 1 according to the present embodiment includes the information input portion 15 adapted to receive inputs of information, wherein the control portion 12 calculates the before-heating temperatures T0a to T0c for first sealing, based on the information inputted to the information input portion 15. Further, the control portion 12 continuously calculates the temperatures of the heater 41 and the heat dissipation portion 14 (for example, the supporting portion 42), while repeating energization to the heater and the stop of this energization. Further, the control portion 12 calculates the before-heating temperatures T0a to T0c for second and later sealing, based on the calculated temperatures T1 and T2 of the heater 41 and the heat dissipation portion 14 (for example, the supporting portion 42).

With this structure, the control portion 12 calculates the before-heating temperatures T0a to T0c for the first sealing, based on the information inputted to the information input portion 15. Further, the control portion 12 controls the electric energy supplied to the heater 41 and calculates the temperature of the object 100, based on these before-heating temperatures T0a to T0c.

Furthermore, the control portion 12 calculates the before-heating temperatures T0a to T0c for the second and later sealing, based on the calculated temperatures T1 and T2 of the heater 41 and the heat dissipation portion 14 (for example, the supporting portion 42). Further, the control portion 12 controls the electric energy supplied to the heater 41 and calculates the temperature of the object 100, based on these before-heating temperatures T0a to T0c. Accordingly, there is no need for a device for actually detecting the temperature (for example, the temperature detection portion 11 according to the first and second embodiments).

Fourth Embodiment

Next, with reference to FIG. 13, a fourth embodiment of an electric heating device will be described. Further, in FIG. 13, portions designated by the same reference characters as the reference characters in FIGS. 1 to 10 represent elements having substantially the same structures or substantially the same functions (effects) as those of the first embodiment and will not be described redundantly.

Figure 13:
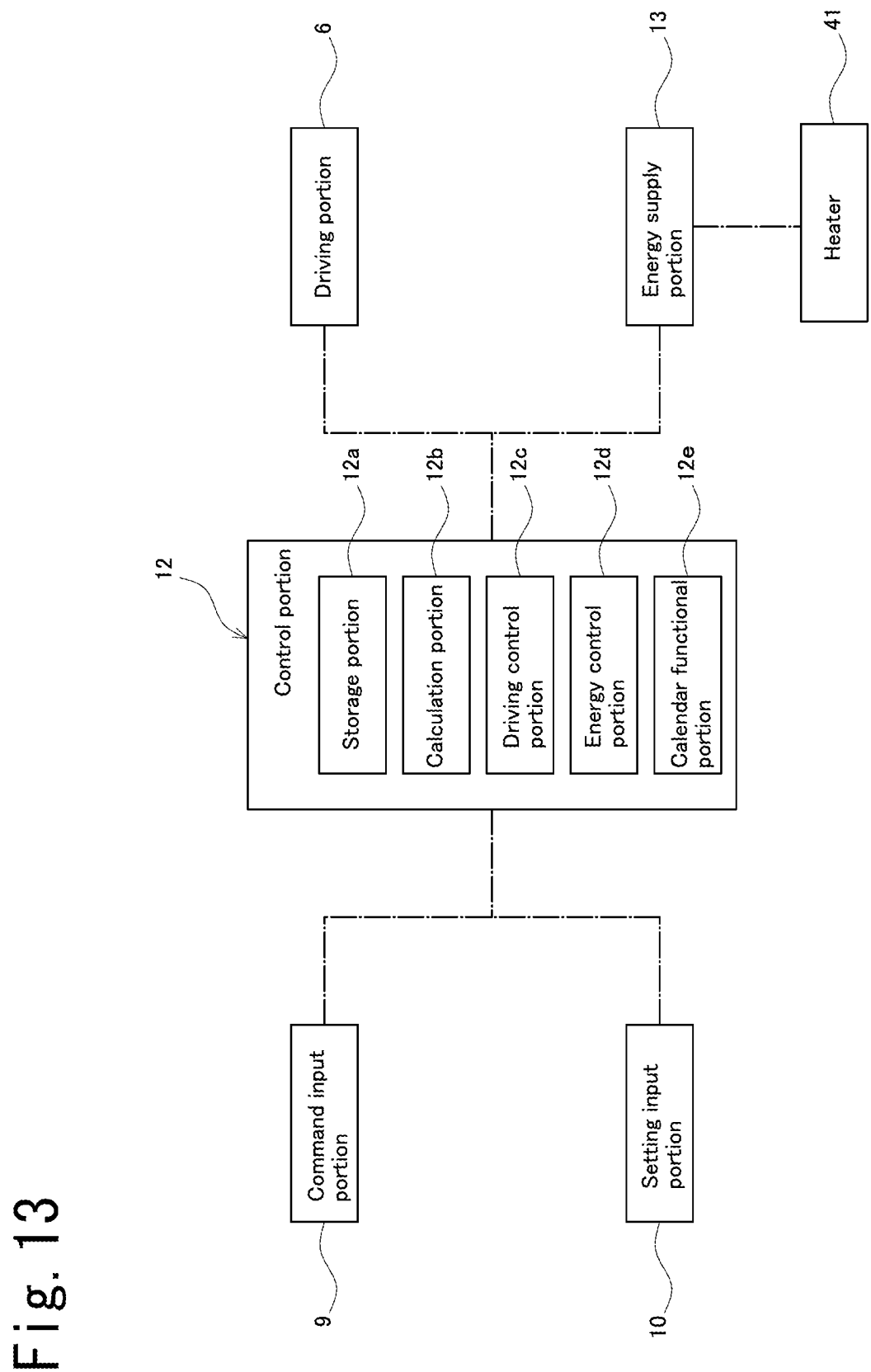
FIG. 13 is a block diagram of an electric heating device according to yet another embodiment.

The electric heating device 1 according to the present embodiment is different from the electric heating device 1 according to the first embodiment, in that it does not include the temperature detection portion 11 and, further, the control portion 12 includes a calendar function, as illustrated in FIG. 13. The control portion 12 includes a calendar functional portion 12e having a calendar function.

The calculation portion 12b calculates the before-heating temperatures T0a to T0c for first sealing, based on the calendar function of the calendar functional portion 12e. More specifically, the storage portion 12a has stored information about the relationship between time and before-heating temperatures T0a to T0c. Further, the calendar functional portion 12e outputs the current time (month and date, date and time, and the like), and the calculation portion 12b calculates the before-heating temperatures T0a to T0c for the first sealing, based on the information stored in the storage portion 12a, and based on the current time outputted from the calendar functional portion 12e.

Further, the calculation portion 12b continuously calculates the temperatures of the heater 41 and the heat dissipation portion 14 (for example, the supporting portion 42), while energization to the heater and stop of this energization are repeated. Further, the calculation portion 12b calculates the before-heating temperatures T0a to T0c for second sealing, based on the calculated temperatures T1 and T2 of the heater 41 and the heat dissipation portion 14 (for example, the supporting portion 42). Further, the calculation portion 12b also calculates the temperature of the object 100, during sealing of the object 100.

As described above, in the electric heating device 1 according to the present embodiment, the control portion 12 includes the calendar function and calculates the before-heating temperatures T0a to T0c for first sealing, based on the calendar function. Further, the control portion 12 continuously calculates the temperatures of the heater 41 and the heat dissipation portion 14 (for example, the supporting portion 42), while repeating energization to the heater and stop of this energization. Further, the control portion 12 calculates the before-heating temperatures T0a to T0c for second sealing, based on the calculated temperatures T1 and T2 of the heater 41 and the heat dissipation portion 14 (for example, the supporting portion 42).

With this structure, the control portion 12 having the calendar function calculates the before-heating temperatures T0a to T0c for first sealing, based on the calendar function. Further, the control portion 12 controls the electric energy supplied to the heater 41 and calculates the temperature of the object 100, based on these before-heating temperatures T0a to T0c.

Furthermore, the control portion 12 calculates the before-heating temperatures T0a to T0c for second sealing, based on the calculated temperatures T1 and T2 of the heater 41 and the heat dissipation portion 14 (for example, the supporting portion 42). Further, the control portion 12 controls the electric energy supplied to the heater 41 and calculates the temperature of the object 100, based on these before-heating temperatures T0a to T0c. Accordingly, there is no need for a device for actually detecting the temperature (for example, the temperature detection portion 11 according to the first and second embodiments).

The electric heating device is not limited to the configuration of the embodiment described above, and the effects are not limited to those described above. It goes without saying that the electric heating device can be variously modified without departing from the scope of the subject matter of the present invention. For example, the constituents, methods, and the like of the plurality of embodiments described above can be arbitrarily employed and combined (the constituents, methods, and the like of one embodiment can be applied to the constituents, methods, and the like of the other embodiments), and the constituents, methods, and the like of various modified examples described below may be arbitrarily selected and employed as the constituents, methods, and the like of the embodiments described above, as a matter of course.

In the electric heating device 1 according to the aforementioned embodiments, only one sealing portion (the first sealing portion) 4, out of the pair of the sealing portions 4 and 5, includes the heater 41. However, the electric heating device is not limited to this structure. For example, the electric heating device can be also structured such that both the sealing portions 4 and 5, out of the pair of the sealing portions 4 and 5, include the heater 41.

Further, in the electric heating device 1 according to the aforementioned embodiments, only the second sealing portion 5 is movable. However, the electric heating device is not limited to this structure. For example, the electric heating device can be also structured such that only the second sealing portion 4 is movable, or both of the pair of the sealing portions 4 and 5 are movable.

Further, in the electric heating device 1 according to the aforementioned embodiments, the control portion 12 is structured to calculate the temperatures of the heater 41, the heat dissipation portion 14 (the supporting portion 42) and the object 100, based on the aforementioned equations 1 to 3. However, the electric heating device is not limited to this structure. For example, in the electric heating device, in consideration of the fact that the object 100 has a smaller thickwise size and has little heat capacity, the control portion 12 can be also structured to calculate the calculated temperature T3 of the object 100, based on the calculated temperature T1 of the heater 41, and based on the calculated temperature T4 of the sealing main body portion 52 in the second sealing portion 5.

As an example, the control portion 12 can also calculate the temperature of the object 100, based on the following equation 1a, the aforementioned equation 2, the following equation 3a, and the following equation 4a. Further, according to the following equation 1a and the following equation 4a, the calculations are conducted based on theoretical data derived on the assumption that the object 100 does not exist, by ignoring the influences of the object 100.

(The calculated temperature T1 of the heater 41)

$$T1 = T0a + \Delta T11 \Delta T12 - \Delta T13a - \Delta T14 \quad \text{(Equation 1a)}$$

Here, $\Delta T13a$ is as follows, and the other reference characters are the same as those in the aforementioned equation 1.

$\Delta T13a$ the temperature change based on the amount of heat transferred to the sealing main body portion 52 from the heater 41

(The calculated temperature T3 of the object 100)

$$T3 = T4 + (T1 - T4) \times \alpha \quad \text{(Equation 3a)}$$

Here, a ranges from 0 to 100% and is a factor determined by the thickness and the material of the object 100.

(The calculated temperature T4 of the sealing main body portion 52)

$$T4 = T0d + \Delta T41a - \Delta T42 - \Delta T43 \quad \text{(Equation 4a)}$$

Here, $\Delta T41a$ is as follows, and the other reference characters are the same as those in the aforementioned equation 4.

$\Delta T41a$: the temperature change based on the amount of heat transferred from the heater 41 to the sealing main body portion 52.

Further, in the electric heating device according to the aforementioned first and second embodiments, the temperature detection portion 11 is structured to detect the temperature of the supporting portion 42 constituting the heat dissipation portion 14. However, the electric heating device is not limited to this structure. For example, in the electric heating device, the temperature detection portion 11 can be also structured to detect the temperature of the object 100. Further, the temperature detection portion 11 can be also structured to detect the temperature of the heater 41. Further, the temperature detection portion 11 can be also structured to detect the temperature of the device main body 2 constituting the heat dissipation portion 14.

Further, in the electric heating device according to the aforementioned first and second embodiments, the control portion 12 is structured to control the electric energy supplied to the heater 41, based on the temperature detected by the temperature detection portion 11 after the elapse of the predetermined time period (the detection standby time period) P1 in a state where the pair of the sealing portions 4 and 5 are sandwiching the object 100. However, the electric heating device is not limited to this structure.

For example, in the electric heating device, the control portion 12 can be also structured to control the electric energy supplied to the heater 41 and to calculate the temperature of the object 100, based on the temperature detected by the temperature detection portion 11 immediately after the pair of the sealing portions 4 and 5 have sandwiched the object 100. Further, for example, the control portion 12 can be also structured to control the electric energy supplied to the heater 41 and to calculate the temperature of the object 100, based on the temperature detected by the temperature detection portion 11 before the pair of the sealing portions 4 and 5 have sandwiched the object 100.

Further, in the electric heating device according to the aforementioned first and second embodiments, the control portion 12 is structured to stop calculating the temperatures of the heater 41 and the heat dissipation portion 14, since the calculated temperatures T1 and T2 of the heater 41 and the heat dissipation portion 14 (the supporting portion 42) have gotten equal to each other, after stopping the energization to the heater 41. However, the electric heating device is not limited to this structure.

For example, the control portion 12 can be also structured to continue calculating the temperatures of the heater 41 and the heat dissipation portion 14 (the supporting portion 42), even when the calculated temperatures T1 and T2 of the heater 41 and the heat dissipation portion 14 (the supporting portion 42) have gotten equal to each other, after stopping the energization to the heater 41. Further, the control portion 12 can be also structured to correct the calculated temperatures T1 and T2 of the heater 41 and the heat dissipation portion 14 (the supporting portion 42), based on the before-heating temperature T0b detected by the temperature detection portion 11, incases of starting the energization to the heater 41 again, thereafter.

DESCRIPTION OF REFERENCE SIGNS

1 Electric heating device
2 Device main body
3 Movable member
4 First sealing portion
5 Second sealing portion
6 Driving portion
7 Placing table
8 Pressure changing portion
9 Command input portion
10 Setting input portion
11 Temperature detection portion
11a Temperature sensor
11b Signal line
12 Control portion
12a Storage portion
12b Calculation portion
12c Driving control portion
12d Energy control portion
12e Calendar functional portion
13 Energy supply portion
14 Heat dissipation portion
15 Information input portion
16 Heater
41 Supporting portion
42a Housing portion
43 Insulation portion
44 Coating portion
51 Elastic portion
52 Sealing main body portion
100 Object
200 Power supply

The invention claimed is:

1. An electric heating device comprising:
a pair of sealers adapted to sandwich an object for sealing the object, at least one of the pair of the sealers comprising a heater adapted to generate heat by being energized and a support frame adapted to support the heater;
an energy supply circuitry adapted to control electric energy supplied to the heater; and
a temperature sensor adapted to detect the before-heating temperature of the support frame,
wherein a portion of the support frame is adapted such that heat from the heater is transferred thereto, and the support frame being adapted to dissipate heat from the heater,
wherein the supporting frame comprises a recessed portion to house the temperature sensor, the temperature sensor being attached to the surface of the supporting frame within the recessed portion and placed in such a way as to be spaced apart from the heater,
wherein the temperature sensor detects a temperature of the supporting frame when the pair of sealers is sandwiching the object and before the heater generates heat,
wherein the energy supply circuitry is adapted to calculate the temperature of the object, heater, and the support frame, and to control electrical energy supplied to the heater, based on the before-heating temperature and the electric energy supplied to the heater,
wherein the energy supply circuitry is adapted to control the electric energy supplied to the heater and to calculate the temperature of the object, based on the before-heating temperature detected by the temperature sensor after elapse of a predetermined time period in a state where the pair of the sealers are sandwiching the object,
wherein the energy supply circuitry is adapted to stop calculating the temperatures of the heater and the support frame after stopping the energization to the heater and the temperature of the heater decreases, when the calculated temperatures of the heater and the support frame after the temperature of the heater decreases become equal to each other, and
wherein the energy supply circuitry is adapted to use the temperature of the supporting frame detected by the temperature sensor as the temperature of the heater for the subsequent sealing operation and before resupplying electrical energy to the heater.

2. The electric heating device according to claim 1, wherein
the energy supply circuitry is adapted to correct the calculated temperatures of the heater and the support frame, based on the before-heating temperature detected by the temperature sensor, if starting the reenergization to the heater, after stopping the energization to the heater and the temperature of the heater decreases but before the calculated temperatures of the heater and the support frame become equal to each other.

3. The electric heating device according to claim 1, wherein
the energy supply circuitry is adapted to maintain the stoppage of energization to the heater, until the calculated temperatures of the heater and the support frame have gotten equal to each other, after stopping the energization to the heater and the temperature of the heater decreases.

4. The electric heating device according to claim 1, further comprising a receiver adapted to receive an input of information,
wherein
the energy supply circuitry is adapted to calculate the before-heating temperature for first sealing, based on the information inputted to the receiver, and
the energy supply circuitry is adapted to continuously calculate the temperatures of the heater and the support frame while repeating the energization to the heater and stop of this energization, and the energy supply circuitry is further adapted to calculate the before-heating temperature for second and later sealing, based on the calculated temperatures of the heater and the support frame.

5. The electric heating device according to claim 1, wherein
the energy supply circuitry comprises a digital calendar and is adapted to calculate the before-heating temperature for first sealing, based on the digital calendar,
wherein
the energy supply circuitry is adapted to continuously calculate the temperatures of the heater and the support frame while repeating the energization to the heater and stopping the energization, and the energy supply circuitry is further adapted to calculate the before-heating temperature for second and later sealing, based on the calculated temperatures of the heater and the support frame.

6. The electric heating device according to claim 1, wherein the energy supply circuitry is adapted to calculate the temperature of the heater as a function of the calculated before-heating temperature of the heater, the amount of heat generated from the heater by the electric energy supplied to the heater, the amount of heat transferred from the heater to the support frame, and the amount of heat transferred from the heater to the object.

7. The electric heating device according to claim 1, wherein the energy supply circuitry is adapted to calculate the temperature of the object as a function of the calculated before-heating temperature of the object, the amount of heat transferred from the heater to the object, the amount of heat transferred from the object to at least one of the sealers.

8. The electric heating device according to claim 1, wherein the heater comprises a band shape and is formed from a conductive heat generating material which generates heat by being impulsively energized.

9. The electric heating device according to claim 1, further comprising an insulating portion between the heater and supporting frame,
wherein the insulation portion is adapted to electrically insulates the heater and the supporting frame from each other, and is adapted to transfer heat from the heater to the supporting frame.

* * * * *